(12) United States Patent
Behar et al.

(10) Patent No.: US 11,847,497 B2
(45) Date of Patent: Dec. 19, 2023

(54) METHODS AND APPARATUS TO ENABLE OUT-OF-ORDER PIPELINED EXECUTION OF STATIC MAPPING OF A WORKLOAD

(71) Applicant: Intel Corporation, Santa Clara, CA (US)

(72) Inventors: Michael Behar, Zichron Yaakov (IL); Moshe Maor, Kiryat Mozking (IL); Ronen Gabbai, Ramat Hashofet (IL); Roni Rosner, Binyamina (IL); Zigi Walter, Haifa (IL); Oren Agam, Zichron Yaacov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,500

(22) Filed: Dec. 23, 2021

(65) Prior Publication Data

US 2022/0197703 A1    Jun. 23, 2022

Related U.S. Application Data

(63) Continuation of application No. 16/542,012, filed on Aug. 15, 2019, now Pat. No. 11,231,963.

(51) Int. Cl.
*G06F 9/46* (2006.01)
*G06F 9/50* (2006.01)
*G06F 3/06* (2006.01)

(52) U.S. Cl.
CPC .......... *G06F 9/5016* (2013.01); *G06F 3/0613* (2013.01); *G06F 3/0659* (2013.01); *G06F 3/0673* (2013.01); *G06F 9/505* (2013.01)

(58) Field of Classification Search
CPC .... G06F 9/5016; G06F 3/0613; G06F 3/0659; G06F 3/0673; G06F 9/505
See application file for complete search history.

(56) References Cited

U.S. PATENT DOCUMENTS 11,231,963 B2   1/2022  Behar et al.
2012/0239833 A1 9/2012  Yoshimura
(Continued)

FOREIGN PATENT DOCUMENTS

JP   H0721144 A    1/1995
JP   2005018620 A  1/2005
(Continued)

OTHER PUBLICATIONS

United States Patent and Trademark Office, "Notice of Allowance," issued in connection with U.S. Appl. No. 16/542,012, dated Sep. 9, 2021, 5 pages.

(Continued)

*Primary Examiner* — Gregory A Kessler
(74) *Attorney, Agent, or Firm* — HANLEY, FLIGHT & ZIMMERMAN, LLC

(57) ABSTRACT

Methods, apparatus, systems and articles of manufacture are disclosed that enable out-of-order pipelined execution of static mapping of a workload to one or more computational building blocks of an accelerator. An example apparatus includes an interface to load a first number of credits into memory; a comparator to compare the first number of credits to a threshold number of credits associated with memory availability in a buffer; and a dispatcher to, when the first number of credits meets the threshold number of credits, select a workload node of the workload to be executed at a first one of the one or more computational building blocks.

20 Claims, 9 Drawing Sheets

(56) References Cited

U.S. PATENT DOCUMENTS

| | | |
|---|---|---|
| 2016/0140071 A1 | 5/2016 | Sanzone et al. |
| 2019/0050261 A1 | 2/2019 | Schmisseur et al. |
| 2019/0370073 A1 | 12/2019 | Behar et al. |

FOREIGN PATENT DOCUMENTS

| | | |
|---|---|---|
| JP | 2012190415 A | 10/2012 |
| JP | 2017525047 A | 8/2017 |
| TW | 201923558 A | 6/2019 |

OTHER PUBLICATIONS

United States Patent and Trademark Office, "Ex Parte Quayle Action," issued in connection with U.S. Appl. No. 16/542,012, filed Jun. 30, 2021, 5 pages.

United States Patent and Trademark Office, "Non-Final Office Action," issued in connection with U.S. Appl. No. 16/542,012, dated Mar. 15, 2021, 9 pages.

Taiwan Intellectual Property Office Ministry of Economic Affairs, "Search Report," issued in connection with Taiwanese Application No. 109120637, dated Dec. 6, 2022, 2 pages, with English translation.

Taiwan Intellectual Property Office Ministry of Economic Affairs, "Non-Final Office Action," issued in connection with Taiwanese Application No. 109120637, dated Dec. 8, 2022, 12 pages, with English machine translation.

Taiwan Intellectual Property Office Ministry of Economic Affairs, "Notice of Allowance," issued in connection with Taiwanese Application No. 109120637, dated Feb. 7, 2023, 3 pages, with English translation.

Japan Patent Office, "Notice of Reasons for Refusal," issued in connection with Japanese Patent Application No. 2020-104328, dated May 16, 2023, 8 pages, with English translation.

Japan Patent Office, "Search Report," issued in connection with Japanese Patent Application No. 2020-104328, dated Apr. 24, 2023, 39 pages, with English translation.

METHODS AND APPARATUS TO ENABLE OUT-OF-ORDER PIPELINED EXECUTION OF STATIC MAPPING OF A WORKLOAD

RELATED APPLICATION

This patent arises from a continuation of U.S. patent application Ser. No. 16/542,012, (now U.S. Pat. No. 11,231,963) which was filed on Aug. 15, 2019. U.S. patent application Ser. No. 16/542,012 is hereby incorporated herein by reference in its entirety. Priority to U.S. patent application Ser. No. 16/542,012 is hereby claimed.

FIELD OF THE DISCLOSURE

This disclosure relates generally to processing, and, more particularly, to methods and apparatus to enable out-of-order pipelined execution of static mapping of a workload.

BACKGROUND

Computer hardware manufacturers develop hardware components for use in various components of a computer platform. For example, computer hardware manufacturers develop motherboards, chipsets for motherboards, central processing units (CPUs), hard disk drives (HDDs), solid state drives (SSDs), and other computer components. Additionally, computer hardware manufacturers develop processing elements, known as accelerators, to accelerate the processing of a workload. For example, an accelerator can be a CPU, a graphics processing units (GPU), a vision processing units (VPU), and/or a field programmable gate arrays (FPGA).

Figure 1:
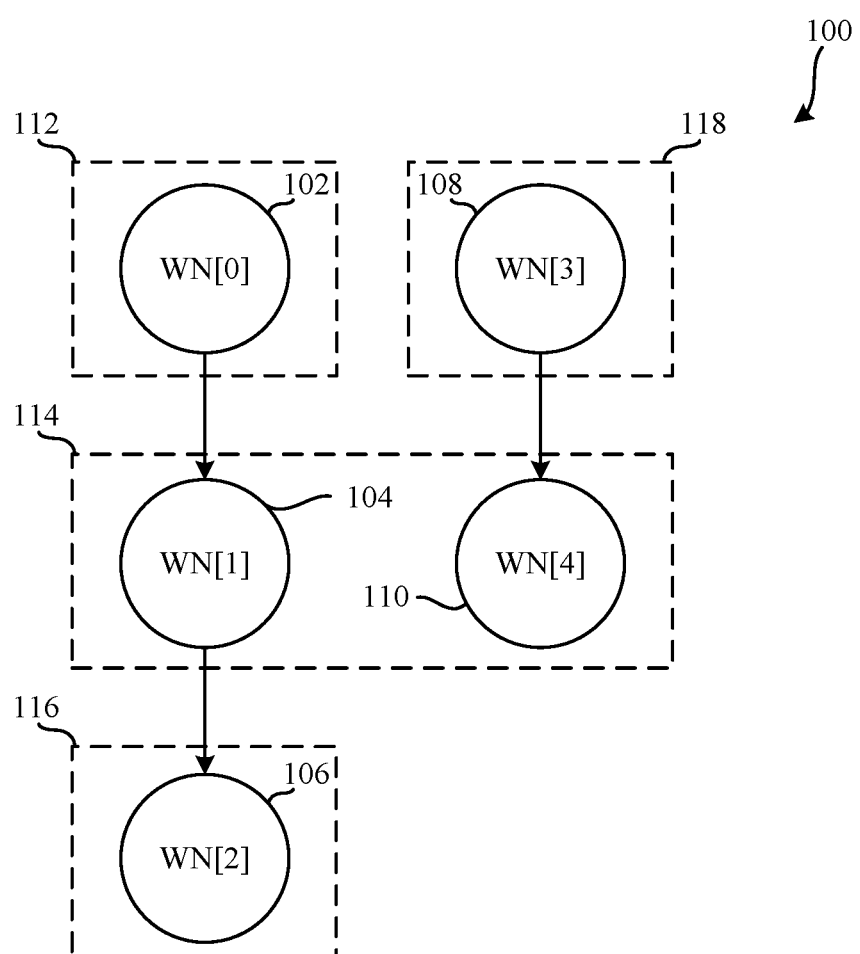
FIG. 1 is a graphical illustration of a graph representative of a workload executing on an accelerator of a heterogenous system.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many computer hardware manufacturers develop processing elements, known as accelerators, to accelerate the processing of a workload. For example, an accelerator can be a central processing unit (CPU), a graphics processing unit (GPU), a vision processing unit (VPU), and/or a field programmable gate array (FPGA). Moreover, accelerators, while capable of processing any type of workload are designed to optimize particular types of workloads. For example, while CPUs and FPGAs can be designed to handle more general processing, GPUs can be designed to improve the processing of video, games, and/or other physics and mathematically based calculations, and VPUs can be designed to improve the processing of machine vision tasks.

Additionally, some accelerators are designed specifically to improve the processing of artificial intelligence (AI) applications. While a VPU is a specific type of AI accelerator, many different AI accelerators can be used. In fact, many AI accelerators can be implemented by application specific integrated circuits (ASICs). Such ASIC-based AI accelerators can be designed to improve the processing of tasks related to a particular type of AI, such as machine learning (ML), deep learning (DL), and/or other artificial machine-driven logic including support vector machines (SVMs), neural networks (NNs), recurrent neural networks (RNNs), convolutional neural networks (CNNs), long short term memory (LSTM), gate recurrent units (GRUs), etc.

Computer hardware manufactures also develop heterogeneous systems that include more than one type of processing element. For example, computer hardware manufactures may combine both general purpose processing elements, such as CPUs, with either general purpose accelerators, such as FPGAs, and/or more tailored accelerators, such as GPUs, VPUs, and/or other AI accelerators. Such heterogeneous systems can be implemented as systems on a chip (SoCs).

When a developer desires to run a function, algorithm, program, application, and/or other code on a heterogeneous system, the developer and/or software generates a schedule for the function, algorithm, program, application, and/or other code at compile time. Once a schedule is generated, the schedule is combined with the function, algorithm, program, application, and/or other code specification to generate an executable file (either for Ahead of Time or Just in Time paradigms). Moreover, a function, algorithm, program, application, and/or other code may be represented as a graph including nodes, where the graph represents a workload and each node represents a particular task of that workload. Furthermore, the connections between the different nodes in the graph represent the data inputs and/or outputs needed to in order for a particular node to be executed and the vertices of the graph represent data dependencies between nodes of the graph.

The executable file includes a number of different executable sections, where each executable section is executable by a specific processing element (e.g., a CPU, a GPU, a VPU, and/or an FPGA). Each executable section of the executable file may further include executable sub-sections, where each executable sub-section is executable by computational building blocks (CBBs) of the specific processing element. Additionally or alternatively, in some examples disclosed herein, a developer and/or software development software can define criteria to determine successful execution of the executable (e.g., success criteria). For example, such success criteria may correspond to executing the executable to meet and/or otherwise satisfy a threshold of utilization of the heterogeneous system and/or specific processing element. In other examples, success criteria may correspond to executing the executable in a threshold amount of time. However, any suitable success function may be utilized when determining how to execute the executable on a heterogeneous system and/or specific processing element. In this manner, the success criteria can be beneficial for a developer, software, and/or artificial intelligence system to generate an executable including a schedule optimized to meet the success criteria.

FIG. 1 is a graphical illustration of a graph 100 representative of a workload executing on an accelerator of a heterogenous system. The graph 100 includes a first workload node 102 (WN[0]), a second workload node 104 (WN[1]), a third workload node 106 (WN[2]), a fourth workload node 108 (WN[3]), and a fifth workload node 110 (WN[4]). In FIG. 1, the accelerator is running the workload represented by the graph 100 via a static software schedule. Static software scheduling includes determining a pre-defined manner in which to execute the different workload nodes of the graph 100 on computational building blocks (CBBs) of an accelerator. For example, the static software schedule assigns the first workload node 102 (WN[0]) to a first CBB 112, the second workload node 104 (WN[1]) to a second CBB 114, the third workload node 106 (WN[2]) to a third CBB 116, the fourth workload node 108 (WN[3]) to a fourth CBB 118, and the fifth workload node 110 (WN[4]) to the second CBB 114.

In FIG. 1, the static software schedule outlines that the first workload node 102 (WN[0]) is to execute on the first CBB 112 in parallel with the fourth workload node 108 (WN[3]) executing on the fourth CBB 118. In FIG. 1, the fourth CBB 118 executes the fourth workload node 108 (WN[3]) faster than the first CBB 112 executes the first workload node 102 (WN[0]). As the static software schedule outlines that the second CBB 114 is to execute the second workload node 104 (WN[1]) before the second CBB 114 is to execute the fifth workload node 110 (WN[4]), the second CBB 114 is idle until the first CBB 112 completes execution of the first workload node 102 (WN[0]). Moreover, waiting until workload nodes are executed completely before executing subsequent workload nodes requires significant memory overhead because the data produced by a CBB executing a first workload node (e.g., the first workload node 102 (WN[0])) needs to be stored on the accelerator before a CBB can execute a second workload node (e.g., the second workload node 104 (WN[1])).

Figure 2:
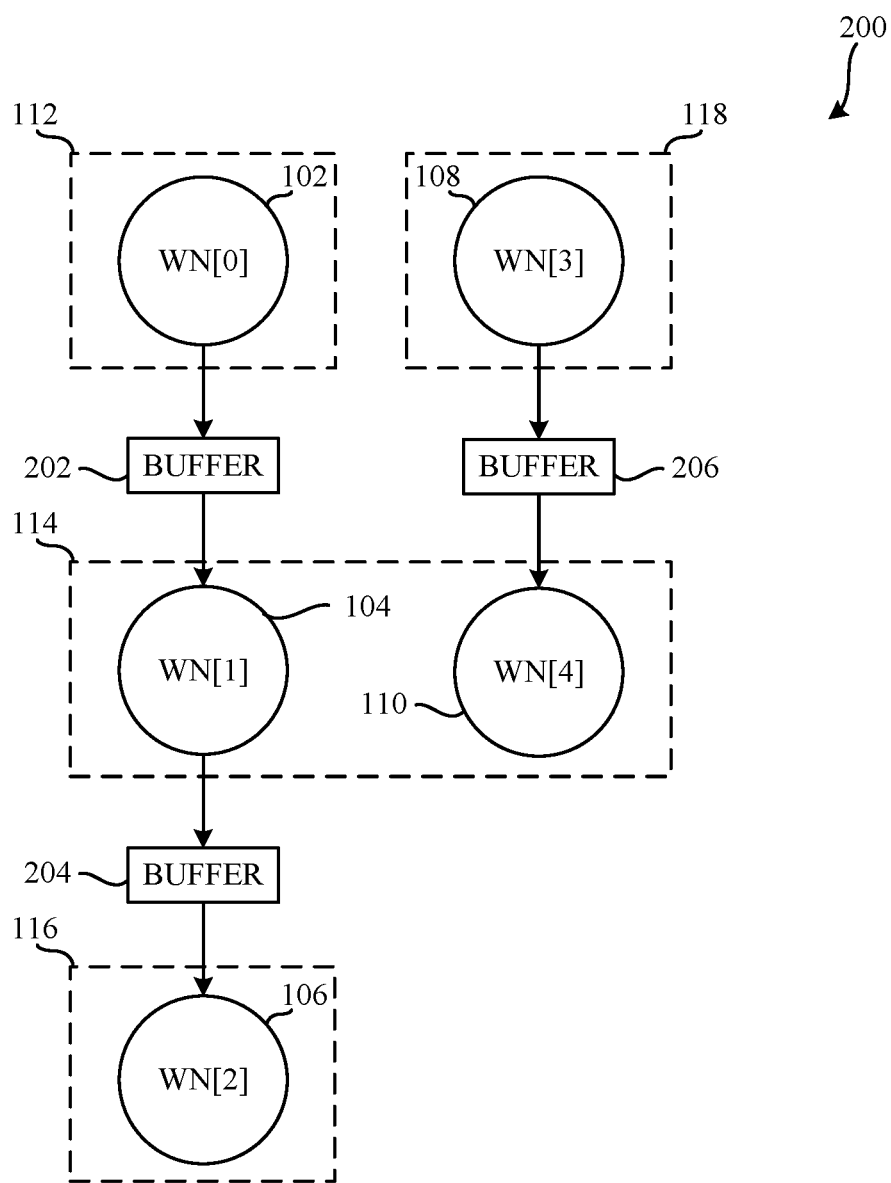
FIG. 2 is a graphical illustration of a graph representative of a workload executing on an accelerator of a heterogenous system implementing pipelining and buffers.

FIG. 2 is a graphical illustration of a graph 200 representative of a workload executing on an accelerator of a heterogenous system implementing pipelining and buffers. The graph 200 includes a first workload node 102 (WN[0]), a second workload node 104 (WN[1]), a third workload node 106 (WN[2]), a fourth workload node 108 (WN[3]), and a fifth workload node 110 (WN[4]). In FIG. 2, the accelerator is running the workload represented by the graph 200 via a static software schedule. The static software schedule of FIG. 2 outlines the execution schedule for the different workload nodes of the graph 200 on CBBs of an accelerator implementing pipelining and including a first buffer 202, a second buffer 204, and a third buffer 206. Additionally, the static software schedule assigns the first workload node 102 (WN[0]) to the first CBB 112, the second workload node 104 (WN[1]) to the second CBB 114, the third workload node 106 (WN[2]) to the third CBB 116, the fourth workload node 108 (WN[3]) to the fourth CBB 118, and the fifth workload node 110 (WN[4]) to the second CBB 114. The first buffer 202 is coupled to the first CBB 112 and the second CBB 114, the second buffer 204 is coupled to the second CBB 114 and the third CBB 116, and the third buffer 206 is coupled to the fourth CBB 118 and the second CBB 114.

The buffers 202, 204, and 206 allow for a static software schedule to outline that each CBB is to process a portion of a workload node (e.g., a tile) in a time interval rather than executing the entire workload node in the time interval. Similarly, the static software schedule can outline that CBBs processing data that is produced by other CBBs (e.g., consumers) can execute portions of a workload node (e.g., a tile) when such portions of the workload are available. However, because CBBs executing workload nodes process available data and write new data to memory, to execute a given workload node on a CBB, a threshold amount of data must be available at runtime and there must be a threshold amount of space in memory to write the results at runtime. While buffers reduce the memory overhead by basic static software scheduling, it is increasingly difficult to outline a static software schedule with buffers because it is highly dependent on the data availabilities and/or dependencies at runtime. Moreover, because the load of the overall accelerator can affect the processing speed of each CBB on the accelerator, it is difficult to develop a static software schedule that effectively utilizes the CBBs of a given accelerator.

Examples disclosed herein include methods and apparatus to enable out-of-order pipelined execution of static mapping of a workload. As opposed to static software scheduling, the examples disclosed herein do not rely on a predetermined static software schedule. Rather, the examples disclosed herein determine which workload nodes that have been assigned to a given CBB to run based on the available data and available memory on an accelerator and/or other processing element. Moreover, each CBB tracks an amount of data associated with a given workload that is available in a first buffer, represented as a first number of credits, and the amount of space available in a second buffer, represented as a second number of credits. This allows a dynamic runtime scheduling of workload nodes on a given CBB.

For each workload node, when a first number of credits meets a first threshold and a second number of credits meets a second threshold, the CBB can execute the workload node. This allows for out-of-order pipelined execution independent of a given graph of the overall workload. Examples disclosed herein provide an apparatus to enable out-of-order pipelined execution of static mapping of a workload to one or more computational building blocks of an accelerator. An example apparatus includes an interface to load a first number of credits into memory; a comparator to compare the first number of credits to a threshold number of credits associated with memory availability in a buffer; and a dispatcher to, when the first number of credits meets the threshold number of credits, select a workload node of the workload to be executed at a first one of the one or more computational building blocks.

Figure 3:
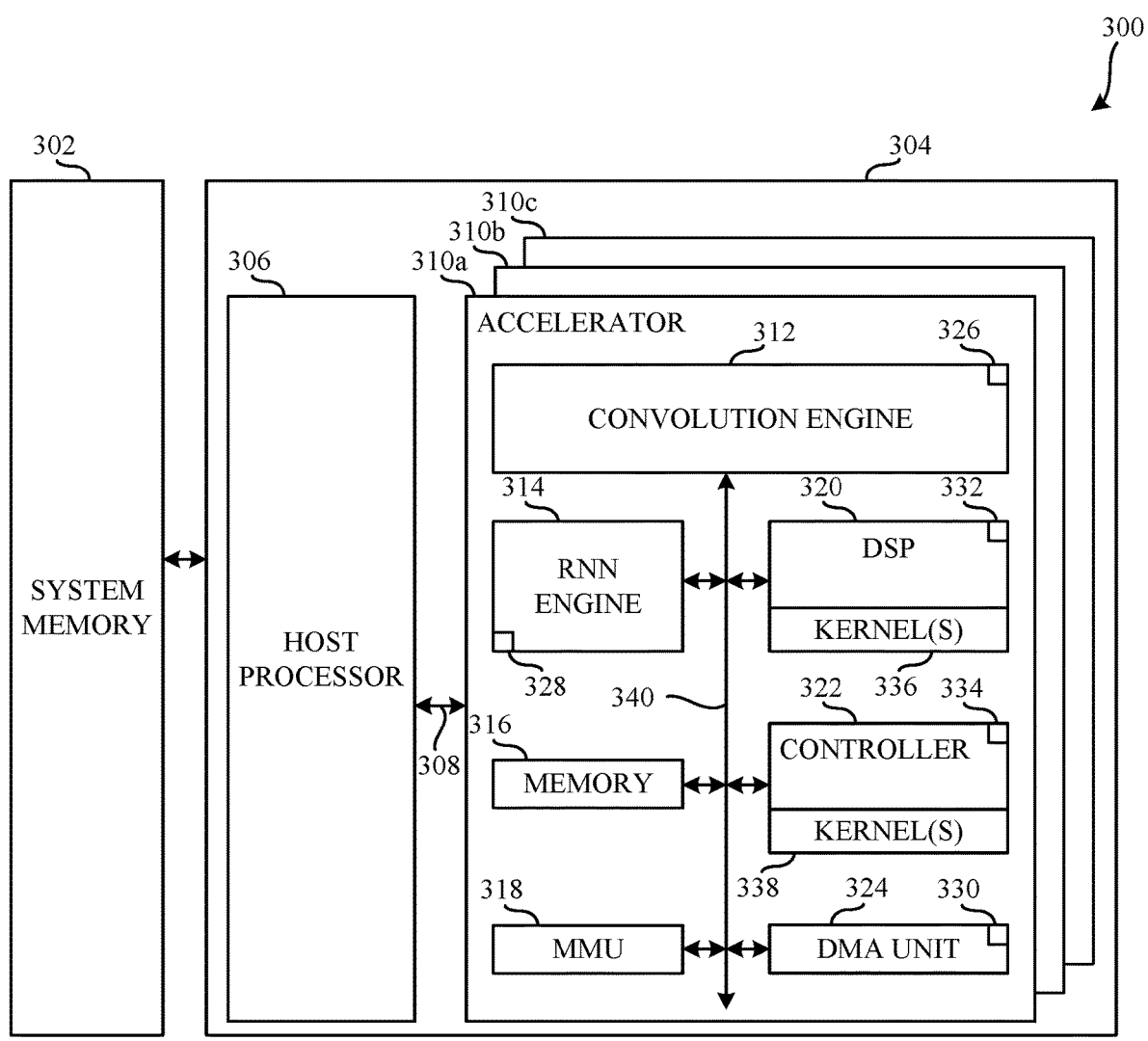
FIG. 3 is a block diagram illustrating an example computing system constructed in accordance with teaching of this disclosure.

FIG. 3 is a block diagram illustrating an example computing system 300 constructed in accordance with teaching of this disclosure. In the example of FIG. 3, the computing system 300 includes an example system memory 302 and an example heterogeneous system 304. The example heterogeneous system 304 includes an example host processor 306, an example first communication bus 308, an example first accelerator 310a, an example second accelerator 310b, and an example third accelerator 310c. Each of the example first accelerator 310a, the example second accelerator 310b, and the example third accelerator 310c includes a variety of CBBs some generic to the operation of an accelerator and some specific to the operation of the respective accelerators.

In the example of FIG. 3, the system memory 302 is coupled to the heterogeneous system 304. The system memory 302 is a memory. In FIG. 3, the system memory 302 is a shared storage between at least one of the host processor 306, the first accelerator 310a, the second accelerator 310b and the third accelerator 310c. In the example of FIG. 3, the system memory 302 is a physical storage local to the computing system 300; however, in other examples, the system memory 302 may be external to and/or otherwise be remote with respect to the computing system 300. In further examples, the system memory 302 may be a virtual storage. In the example of FIG. 3, the system memory 302 is a persistent storage (e.g., read only memory (ROM), programmable ROM (PROM), erasable PROM (EPROM), electrically erasable PROM (EEPROM), etc.). In other examples, the system memory 302 may be a persistent basic input/output system (BIOS) or a flash storage. In further examples, the system memory 302 may be a volatile memory.

In FIG. 3, the heterogeneous system 304 is coupled to the system memory 302. In the example of FIG. 3, the heterogeneous system 304 processes a workload by executing the workload on the host processor 306 and/or one or more of the first accelerator 310a, the second accelerator 310b, or the third accelerator 310c. In FIG. 3, the heterogeneous system 304 is an SoC. Alternatively, the heterogeneous system 304 may be any other type of computing or hardware system.

In the example of FIG. 3, the host processor 306 is a processing element that executes instructions (e.g., machine-readable instructions) to execute, perform, and/or facilitate a completion of operations associated with a computer or computing device (e.g., the computing system 300). In the example of FIG. 3, the host processor 306 is a primary processing element for the heterogeneous system 304 and includes at least one core. Alternatively, the host processor 306 may be a co-primary processing element (e.g., in an example where more than one CPU is utilized) while, in other examples, the host processor 306 may be a secondary processing element.

In the illustrated example of FIG. 3, one or more of the first accelerator 310a, the second accelerator 310b, and/or the third accelerator 310c are processing elements that may be utilized by a program executing on the heterogeneous system 304 for computing tasks, such as hardware acceleration. For example, the first accelerator 310a is a processing element that includes processing resources that are designed and/or otherwise configured or structured to improve the processing speed and overall performance of processing machine vision tasks for AI (e.g., a VPU).

In examples disclosed herein, each of the host processor 306, the first accelerator 310a, the second accelerator 310b, and the third accelerator 310c is in communication with the other elements of the computing system 300 and/or the system memory 302. For example, the host processor 306, the first accelerator 310a, the second accelerator 310b, the third accelerator 310c, and/or the system memory 302 are in communication via first communication bus 308. In some examples disclosed herein, the host processor 306, the first accelerator 310a, the second accelerator 310b, the third accelerator 310c, and/or the system memory 302 may be in communication via any suitable wired and/or wireless communication system. Additionally, in some examples disclosed herein, each of the host processor 306, the first accelerator 310a, the second accelerator 310b, the third accelerator 310c, and/or the system memory 302 may be in communication with any component exterior to the computing system 300 via any suitable wired and/or wireless communication system.

In the example of FIG. 3, the first accelerator 310a includes an example convolution engine 312, an example RNN engine 314, an example memory 316, an example memory management unit (MMU) 318, an example DSP 320, an example controller 322, and an example direct memory access (DMA) unit 324. Additionally, each of the example convolution engine 312, the example RNN engine 314, the example DMA unit 324, the example DSP 320, and the example controller 322 includes an example first scheduler 326, an example second scheduler 328, an example third scheduler 330, an example fourth scheduler 332, and an example fifth scheduler 334, respectively. Each of the example DSP 320 and the example controller 322 additionally include an example first kernel library 336 and an example second kernel library 338.

In the illustrated example of FIG. 3, the convolution engine 312 is a device that is configured to improve the processing of tasks associated convolution. Moreover, the convolution engine 312 improves the processing of tasks associated with the analysis of visual imagery and/or other tasks associated with CNNs. In FIG. 3, the RNN engine 314 is a device that is configured to improve the processing of tasks associated with RNNs. Additionally, the RNN engine 314 improves the processing of tasks associated with the analysis of unsegmented, connected handwriting recognition, speech recognition, and/or other tasks associated with RNNs.

In the example of FIG. 3, the memory 316 is a shared storage between at least one of the convolution engine 312, the RNN engine 314, the MMU 318, the DSP 320, the controller 322 and the DMA unit 324. In the example of FIG. 3, the memory 316 is a physical storage local to the first accelerator 310a; however, in other examples, the memory 316 may be external to and/or otherwise be remote with respect to the first accelerator 310a. In further examples, the memory 316 may be a virtual storage. In the example of FIG. 3, the memory 316 is a persistent storage (e.g., ROM, PROM, EPROM, EEPROM, etc.). In other examples, the memory 316 may be a persistent BIOS or a flash storage. In further examples, the memory 316 may be a volatile memory.

In the illustrated example of FIG. 3, the example MMU 318 is a device that includes references to the addresses of the memory 316 and/or the system memory 302. The MMU 318 additionally translates virtual memory addresses utilized by one or more of the convolution engine 312, the RNN engine 314, the DSP 320, and/or the controller 322 to physical addresses in the memory 316 and/or the system memory 302.

In the example of FIG. 3, the DSP 320 is a device that improves the processing of digital signals. For example, the DSP 320 facilitates the processing to measure, filter, and/or compress continuous real-world signals such as data from cameras, and/or other sensors related to computer vision. In FIG. 3, the controller 322 is implemented as a control unit of the first accelerator 310a. For example, the controller 322 directs the operation of the first accelerator 310a. In some examples, the controller 322 implements a credit manager. Moreover, the controller 322 can instruct one or more of the convolution engine 312, the RNN engine 314, the memory 316, the MMU 318, and/or the DSP 320 how to respond to machine readable instructions received from the host processor 306.

In the illustrated example of FIG. 3, the DMA unit 324 is a device allows at least one of the convolution engine 312, the RNN engine 314, the DSP 320, and the controller 322 to access the system memory 302 independent of the host processor 306. For example, the DMA unit 324 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the example of FIG. 3, each of the first scheduler 326, the second scheduler 328, the third scheduler 330, the fourth scheduler 332, and the fifth scheduler 334 is a device that determines when the convolution engine 312, the RNN engine 314, the DMA unit 324, the DSP 320, and the controller 322, respectively, executes a portion of a workload that has been offloaded and/or otherwise sent to the first accelerator 310a. Additionally, each of the first kernel library 336 and the second kernel library 338 is a data structure that includes one or more kernels. The kernels of the first kernel library 336 and the second kernel library 338 are, for example, routines compiled for high throughput on the DSP 320 and the controller 322, respectively. The kernels correspond to, for example, executable sub-sections of an executable to be run on the computing system 300.

In examples disclosed herein, each of the convolution engine 312, the RNN engine 314, the memory 316, the MMU 318, the DSP 320, the controller 322, and the DMA unit 324 is in communication with the other elements of the first accelerator 310a. For example, the convolution engine 312, the RNN engine 314, the memory 316, the MMU 318, the DSP 320, the controller 322, and the DMA unit 324 are in communication via an example second communication bus 340. In some examples, the second communication bus 340 may be implemented by a configuration and control (CnC) fabric and a data fabric. In some examples disclosed herein, the convolution engine 312, the RNN engine 314, the memory 316, the MMU 318, the DSP 320, the controller 322, and the DMA unit 324 may be in communication via any suitable wired and/or wireless communication system. Additionally, in some examples disclosed herein, each of the convolution engine 312, the RNN engine 314, the memory 316, the MMU 318, the DSP 320, the controller 322, and the DMA unit 324 may be in communication with any component exterior to the first accelerator 310a via any suitable wired and/or wireless communication system.

As previously mentioned, each of the example first accelerator 310a, the example second accelerator 310b, and the example third accelerator 310c includes a variety of CBBs some generic to the operation of an accelerator and some specific to the operation of the respective accelerators. For example, each of the first accelerator 310a, the second accelerator 310b, and the third accelerator 310c includes generic CBBs such as memory, an MMU, a controller, and respective schedulers for each of the CBBs.

While, in the example of FIG. 3, the first accelerator 310a implements a VPU and includes the convolution engine 312, the RNN engine 314, and the DSP 320, (e.g., CBBs specific to the operation of specific to the operation of the first accelerator 310a), the second accelerator 310b and the third accelerator 310c may include additional or alternative CBBs specific to the operation of the second accelerator 310b and/or the third accelerator 310c. For example, if the second accelerator 310b implements a GPU, the CBBs specific to the operation of the second accelerator 310b can include a thread dispatcher, a graphics technology interface, and/or any other CBB that is desirable to improve the processing speed and overall performance of processing computer graphics and/or image processing. Moreover, if the third accelerator 310c implements a FPGA, the CBBs specific to the operation of the third accelerator 310c can include one or more arithmetic logic units (ALUs), and/or any other CBB that is desirable to improve the processing speed and overall performance of processing general computations.

While the heterogeneous system 304 of FIG. 3 includes the host processor 306, the first accelerator 310a, the second accelerator 310b, and the third accelerator 310c, in some examples, the heterogeneous system 304 may include any number of processing elements (e.g., host processors and/or accelerators) including application-specific instruction set processors (ASIPs), physic processing units (PPUs), designated DSPs, image processors, coprocessors, floating-point units, network processors, multi-core processors, and front-end processors.

Moreover, while in the example of FIG. 3 the convolution engine 312, the RNN engine 314, the memory 316, the MMU 318, the DSP 320, the controller 322, the DMA unit 324, the first scheduler 326, the second scheduler 328, the third scheduler 330, the fourth scheduler 332, the fifth scheduler 334, the first kernel library 336, and the second kernel library 338 are implemented on the first accelerator 310a, one or more of the convolution engine 312, the RNN engine 314, the memory 316, the MMU 318, the DSP 320, the controller 322, the DMA unit 324, the first scheduler 326, the second scheduler 328, the third scheduler 330, the fourth scheduler 332, the fifth scheduler 334, the first kernel library 336, and the second kernel library 338 can be implemented on the host processor 306, the second accelerator 310b, and/or the third accelerator 310c.

Figure 4:
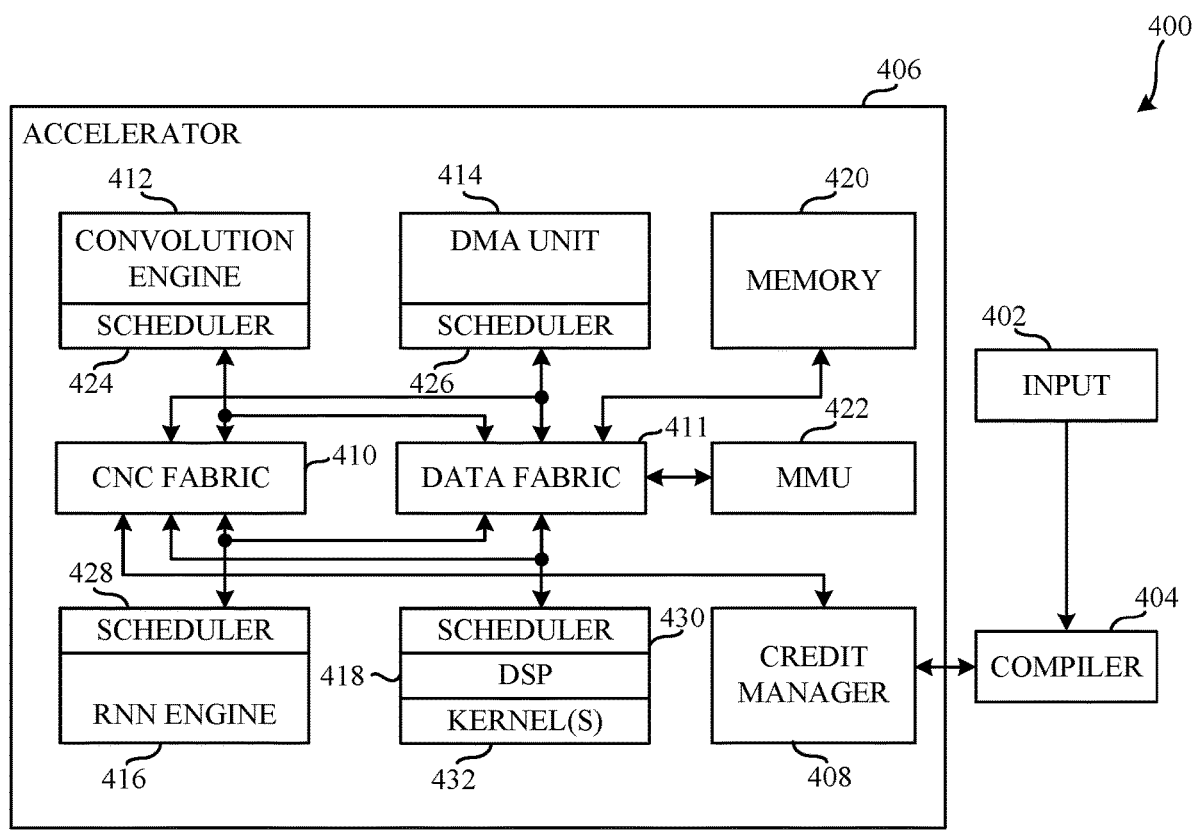
FIG. 4 is a block diagram illustrating an example computing system including example one or more schedulers.

FIG. 4 is a block diagram illustrating an example computing system 400 including example one or more schedulers. In some examples, the computing system 400 can correspond to the computing system 300 of FIG. 3. In the example of FIG. 4, the computing system 400 includes an example input 402, an example compiler 404, and an example accelerator 406. In some examples, the accelerator 406 can correspond to the first accelerator 310a of FIG. 3. In FIG. 4, the input 402 is coupled to the compiler 404. The input 402 is a workload to be executed by the accelerator 406. In some examples, the compiler 404 can correspond to the host processor 306 of FIG. 3 and/or an external device.

In the example of FIG. 4, the input 402 is, for example, a function, algorithm, program, application, and/or other code to be executed by the accelerator 406. In some examples, the input 402 is a graph description of a function, algorithm, program, application, and/or other code. In additional or alternative examples, the input 402 is a workload related to AI processing, such as deep learning and/or computer vision.

In the illustrated example of FIG. 4, the compiler 404 is coupled to the input 402 and the accelerator 406. The compiler 404 receives the input 402 and compiles the input 402 into one or more executables to be executed by the accelerator 406. For example, the compiler 404 is a graph compiler that receives the input 402 and assigns various workload nodes of the workload (e.g., the input 402) to various CBBs of the accelerator 406. Additionally, the compiler 404 allocates memory for one or more buffers in the memory of the accelerator 406.

In the example of FIG. 4, the accelerator 406 is coupled to the compiler 404 and includes an example credit manager 408, an example CnC fabric 410, an example data fabric 411, an example convolution engine 412, an example DMA unit 414, an example RNN engine 416, an example DSP 418, an example memory 420, and an example MMU 422. Additionally, each of the example convolution engine 412, the example DMA unit 414, the example RNN engine 416, and the example DSP 418 includes an example first scheduler 424, an example second scheduler 426, an example third scheduler 428, and an example fourth scheduler 430, respectively. Moreover, the example DSP 418 includes an example kernel library 432. In some examples, the first scheduler 424 can correspond to the first scheduler 326 of FIG. 3. In additional or alternative examples, the second scheduler 426 can correspond to the third scheduler 330 of FIG. 3. In further examples, the third scheduler 428 can correspond to the second scheduler 328 of FIG. 3. In some examples, the fourth scheduler 430 can correspond to the fourth scheduler 332 of FIG. 4.

In the illustrated example of FIG. 4, the credit manager 408 is coupled to the compiler 404, and the CnC fabric 410. The credit manager 408 is a device that manages credits associated with one or more of the convolution engine 412, the DMA unit 414, the RNN engine 416, and/or the DSP 418. In some examples, the credit manager 408 can be implemented by a controller as a credit manager controller. Credits are representative of data associated with workload nodes that is available in the memory 420 and/or the amount of space available in the memory 420 for the output of the workload node. For example, the credit manager 408 can partition the memory 420 into one or more buffers associated with each workload node of a given workload based on one or more executables received from the compiler 404. If a workload node is configured to write data to a buffer, the workload node is a producer and if the workload node is configured to read data from a buffer, the workload node is a consumer.

In the example of FIG. 4, the credit manager 408 is additionally configured to send credits to and/or receive credits from one or more of the convolution engine 412, the DMA unit 414, the RNN engine 416, and/or the DSP 418. In some example, the credit manager 408 is implemented as a control unit of the accelerator 406. For example, the credit manager 408 can direct the operation of the accelerator 406. Moreover, the credit manager 408 can instruct one or more of the convolution engine 412, the DMA unit 414, the RNN engine 416, and/or the DSP 418 how to respond to executables and/or other machine readable instructions received from the compiler 404.

In the example of FIG. 4, the CnC fabric 410 is coupled to the credit manager 408, the convolution engine 412, the DMA unit 414, the RNN engine 416, and the DSP 418. The CnC fabric 410 is a network of electronic interconnections and at least one logic circuit that allow one or more of the credit manager 408, the convolution engine 412, the DMA unit 414, the RNN engine 416, and/or the DSP 418 to transmit credits to and/or receive credits from one or more of the credit manager 408, the convolution engine 412, the DMA unit 414, the RNN engine 416, and/or the DSP 418. In some examples, the CnC fabric 410 can correspond to the second communication bus 340 of FIG. 3.

In the example of FIG. 4, the data fabric 411 is coupled to the convolution engine 412, the DMA unit 414, the RNN engine 416, the DSP 418, the memory 420, and the MMU 422. The data fabric 411 is a network of electronic interconnections and at least one logic circuit that allow one or more of the credit manager 408, the convolution engine 412, the RNN engine 416, the DSP 418, the memory 420, and/or the MMU 422 to transmit data to and/or receive data from one or more of the credit manager 408, the convolution engine 412, the RNN engine 416, the DSP 418, the memory 420, and/or the MMU 422. In some examples, the data fabric 411 can correspond to the second communication bus 340 of FIG. 3.

In the illustrated example of FIG. 4, the convolution engine 412 is coupled to the CnC fabric 410 and the data fabric 411. The convolution engine 412 is a device that is configured to improve the processing of tasks associated convolution. Moreover, the convolution engine 412 improves the processing of tasks associated with the analysis of visual imagery and/or other tasks associated with CNNs. In some examples, the convolution engine 412 can correspond to the convolution engine 312 of FIG. 3.

In the illustrated example of FIG. 4, the DMA unit 414 is coupled to the CnC fabric 410 and the data fabric 411. The DMA unit 414 is a device that allows at least one of the, the convolution engine 412, the, the RNN engine 416, or the DSP 418 to access a memory (e.g., the system memory 302) remote to the accelerator 406 independent of a respective processor (e.g., the host processor 306). In some examples, the DMA unit 414 can correspond to the DMA unit 324 of FIG. 3. For example, the DMA unit 414 can be implemented by one or more analog or digital circuit(s), logic circuits, programmable processor(s), programmable controller(s), GPU(s), DSP(s), ASIC(s), PLD(s) and/or FPLD(s).

In FIG. 4, the RNN engine 416 is coupled to the CnC fabric 410 and the data fabric 411. The RNN engine 416 is a device that is configured to improve the processing of tasks associated with RNNs. Additionally, the RNN engine 416 improves the processing of tasks associated with the analysis of unsegmented, connected handwriting recognition, speech recognition, and/or other tasks associated with RNNs. In some examples, the RNN engine 416 can correspond to the RNN engine 314 of FIG. 3.

In the example of FIG. 4, the DSP 418 is coupled to the CnC fabric 410 and the data fabric 411. The DSP 418 is a device that improves the processing of digital signals. For example, the DSP 418 facilitates the processing to measure, filter, and/or compress continuous real-world signals such as data from cameras, and/or other sensors related to computer vision. In some example the DSP 418 can correspond to the DSP 320 of FIG. 3.

In the example of FIG. 4, the memory 420 is coupled to the data fabric 411. The memory 420 is a shared storage between at least one of the convolution engine 412, the DMA unit 414, the RNN engine 416, and the DSP 418. In some examples, the memory 420 can correspond to the memory 316 of FIG. 3. The memory 420 can be partitioned into one or more buffers associated with one or more workload nodes of a workload associated with an executable received by the credit manager 408. In the example of FIG. 4, the memory 420 is a physical storage local to the accelerator 406. However, in other examples, the memory 420 may be external to and/or otherwise be remote with respect to the accelerator 406. In further examples, the memory 420 may be a virtual storage. In the example of FIG. 4, the memory 420 is a persistent storage (e.g., ROM, PROM, EPROM, EEPROM, etc.). In other examples, the memory 420 may be a persistent BIOS or a flash storage. In further examples, the memory 420 may be a volatile memory.

In the illustrated example of FIG. 4, the example MMU 422 is coupled to the data fabric 411. The MMU 422 is a device that includes references to the addresses of the memory 420 and/or a memory that is remote with respect to the accelerator 406. The MMU 422 additionally translates virtual memory addresses utilized by one or more of, the convolution engine 412, the DMA unit 414, the RNN engine 416, and/or the DSP 418 to physical addresses in the memory 420 and/or the memory that is remote with respect to the accelerator 406. In some examples, the MMU 422 can correspond to the MMU 318 of FIG. 3.

In the example of FIG. 4, each of the first scheduler 424, the second scheduler 426, the third scheduler 428, and the fourth scheduler 430, is a device that determines when the convolution engine 412, the DMA unit 414, the RNN engine 416, and the DSP 418, respectively, executes a portion of a workload (e.g., a workload node) that has been assigned to the convolution engine 412, the DMA unit 414, the RNN engine 416, and the DSP 418, respectively, by the credit manager 408 and/or an additional CBB of the accelerator 406. Depending on the tasks and/or other operations of a given workload node, the workload node can be a producer or a consumer. A producer workload node produces data that is utilized by another workload node whereas a consumer workload node consumes and/or otherwise processes data produced by another workload node.

In the illustrated example of FIG. 4, the kernel library 432 is a data structure that includes one or more kernels. In some examples, the kernel library 432 can correspond to the first kernel library 336 of FIG. 3. The kernels of the kernel library 432 are, for example, routines compiled for high throughput on the DSP 418. The kernels correspond to, for example, executable sub-sections of an executable to be run on the accelerator 406. While, in the example of FIG. 4, the accelerator 406 implements a VPU and includes the credit manager 408, the CnC fabric 410, the data fabric 411, the convolution engine 412, the DMA unit 414, the RNN engine 416, the DSP 418, the memory 420, and the MMU 422, the accelerator 406 may include additional or alternative CBBs to those illustrated in FIG. 4.

In the example of FIG. 4, in operation, the first scheduler 424 loads the credits corresponding to the input buffers to a workload node and output buffers from a workload node for workload nodes assigned to the convolution engine 412. For example, an input buffer is a buffer to which a workload node is configured to read data from while an output buffer is a buffer from which a workload node is configured to write data. In some examples, the input buffer of a first workload node can be the output buffer of a second workload node. Moreover, the first scheduler 424 receives and/or otherwise obtains credits from the credit manager 408.

In the example of FIG. 4, in operation, the first scheduler 424 selects a workload node assigned to the convolution engine 412 and determines whether the first scheduler 424 has received a threshold amount of credits in order to operate on the data stored in the input buffer to the selected workload node. For example, the first scheduler 424 compares a number of credits received from a producer workload node for the input buffer to a threshold number of credits for the input buffer. If the first scheduler 424 has not received the threshold amount of credits, the first scheduler 424 repeats the process on another workload node assigned to the convolution engine 412.

In the example illustrated in FIG. 4, in operation, if the first scheduler 424 has received the threshold amount of credits in order to operate on the data stored in the input buffer to the selected workload node, the first scheduler 424 determines whether the first scheduler 424 has received a threshold amount of credits in order to write data to the output buffer for the selected workload node. For example, the first scheduler 424 compares a number of credits received from a consumer workload node for the output buffer to a threshold number of credits for the output buffer for the selected workload node. If the first scheduler 424 has not received the threshold amount of credits, the first scheduler 424 repeats the process on another workload node assigned to the convolution engine 412. If the first scheduler 424 has received the threshold amount of credits in order to write data to the output buffer, the first scheduler 424 indicates that the selected workload node is ready to execute. Subsequently, the first scheduler 424 repeats this process for additional workload nodes assigned to the convolution engine 412.

In the example of FIG. 4, in operation, after the workload nodes assigned to the convolution engine 412 have been analyzed, the first scheduler 424 schedules the workload nodes that are ready to execute. The first scheduler 424 subsequently dispatches a workload node according to the schedule. After the dispatched workload node is executed by the convolution engine 412, the first scheduler 424 sends the credits corresponding to the input buffer and/or the output buffer to the credit manager 408. The first scheduler 424 determines if there are additional workload nodes in the schedule to be executed. If there are additional workload nodes in the schedule, the first scheduler 424 causes the next workload node in the schedule to be executed on the convolution engine 412.

Figure 5:
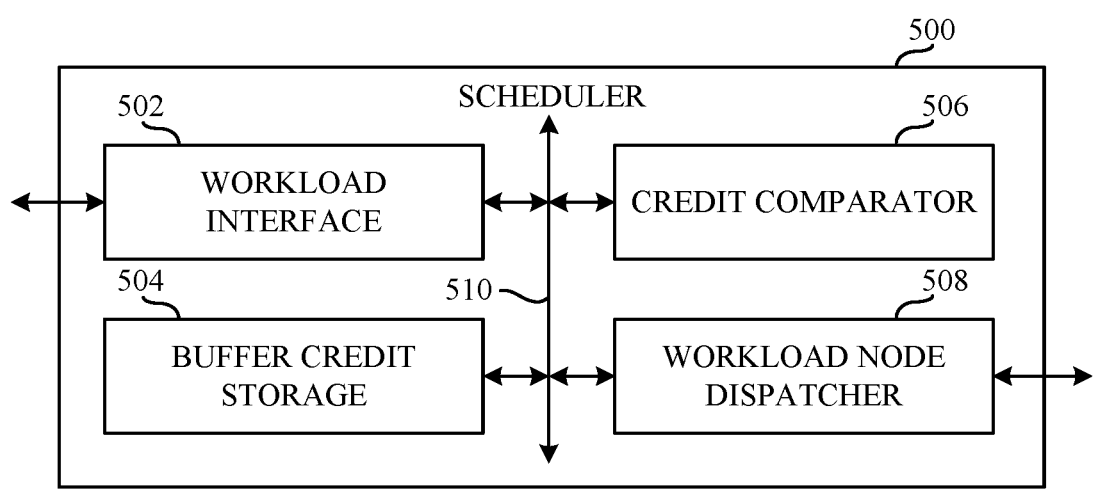
FIG. 5 is a block diagram of an example scheduler that can implement one or more of the schedulers of FIGS. 3 and 4.

FIG. 5 is a block diagram of an example scheduler 500 that can implement one or more of the schedulers of FIGS. 3 and 4. For example, the scheduler 500 is an example implementation of the first scheduler 326, the second scheduler 328, the third scheduler 330, the fourth scheduler 332, and/or the fifth scheduler 334 of FIG. 3, and/or the first scheduler 424, the second scheduler 426, the third scheduler 428 and/or the fourth scheduler 430 of FIG. 4, and/or the scheduler 600 of FIG. 6, and/or the first scheduler 722, the second scheduler 724, the third scheduler 726, and/or the fourth scheduler 728 of FIG. 7.

In the example of FIG. 5, the scheduler 500 includes an example workload interface 502, an example buffer credit storage 504, an example credit comparator 506, an example workload node dispatcher 508, and an example communication bus 510. The scheduler 500 is a device that determines when a CBB with which the scheduler 500 is associated executes a portion of a workload (e.g., a workload node) that has been assigned to the CBB with which the scheduler 500 is associated.

In the illustrated example of FIG. 5, workload interface 502 is a device that is configured to communicate with other devices external to the scheduler 500, the buffer credit storage 504, the credit comparator 506, and/or the workload node dispatcher 508. For example, the workload interface 502 can receive and/or otherwise obtain workload nodes to be executed by the CBB with which the scheduler 500 is associated. Additionally or alternatively, the workload interface 502 can transmit and/or receive credits from other schedulers, other CBBs, and/or other devices. Moreover, the workload interface 502 can load the credits corresponding to the input buffers to a workload node and/or the output buffers from a workload node into and/or out of the buffer credit storage 504.

In some examples, the example workload interface 502 implements example means for interfacing. The interfacing means is implemented by executable instructions such as that implemented by at least blocks 802, 818, and 822 of FIG. 8. For example, the executable instructions of blocks 802, 818, and 822 of FIG. 8 may be executed on at least one processor such as the example processor 910 and/or the example accelerator 912 shown in the example of FIG. 9. In other examples, the interfacing means is implemented by hardware logic, hardware implemented state machines, logic circuitry, and/or any other combination of hardware, software, and/or firmware.

In the example illustrated in FIG. 5, the buffer credit storage 504 is a shared storage between at least one of the workload interface 502, the credit comparator 506, and/or the workload node dispatcher 508. The buffer credit storage 504 is a physical storage local to the scheduler 500; however, in other examples, the buffer credit storage 504 may be external to and/or otherwise be remote with respect to the scheduler 500. In further examples, the buffer credit storage 504 may be a virtual storage. In the example of FIG. 5, the buffer credit storage 504 is a persistent storage (e.g., ROM, PROM, EPROM, EEPROM, etc.). In other examples, the buffer credit storage 504 may be a persistent BIOS or a flash storage. In further examples, the buffer credit storage 504 may be a volatile memory.

In the example of FIG. 5, the buffer credit storage 504 is memory that is associated with storing credits corresponding to input buffers to workload nodes and/or output buffers from workload nodes associated with workload nodes assigned to the CBB with which the scheduler 500 is associated. For example, the buffer credit storage 504 can be implemented as a data structure including fields for each workload node that is assigned to the CBB with which the scheduler 500 is associated and fields for each input buffers to workload nodes and/or each output buffers from workload nodes associated with workload nodes assigned to the CBB with which the scheduler 500 is associated.

In the illustrated example of FIG. 5, the buffer credit storage 504 can additionally or alternatively store workload nodes that have been assigned to the CBB with which the scheduler 500 is associated and/or a threshold amount of credits corresponding to input buffers to workload nodes and/or output buffers from the workload nodes. Moreover, the buffer credit storage 504 includes a field associated with a threshold number of credits for input buffers to each workload node and/or output buffers from each workload node.

In the example of FIG. 5, when the workload node is a producer (e.g., the workload node generates data to be utilized by another workload node), the threshold number of credits corresponds to a threshold amount of space in an output buffer (e.g., a partitioned space in the memory 420) that is to be met before the CBB with which the scheduler 500 is associated with can execute the producer workload node. Additionally, when the workload node is a consumer (e.g., the workload node processes data generated by another workload node), the threshold number of credits corresponds to a threshold amount of data in an input buffer (e.g., a partitioned space in the memory 420) that is to be met before the CBB with which the scheduler 500 is associated with can execute the consumer workload node.

In some examples, the example buffer credit storage 504 implements example means for storing. The storing means can be implemented by executable instructions such as that implemented in FIG. 8. For example, the executable instructions may be executed on at least one processor such as the example processor 910 and/or the example accelerator 912 shown in the example of FIG. 9. In other examples, the storage means is implemented by hardware logic, hardware implemented state machines, logic circuitry, and/or any other combination of hardware, software, and/or firmware.

In the example illustrated in FIG. 5, the credit comparator 506 is a device that is configured to determine whether the threshold number of credits have been received that correspond to input buffers to workload nodes and/or output buffers from workload nodes assigned to the CBB with which the scheduler 500 is associated. The credit comparator 506 is configured to select a workload node assigned to the CBB with which the scheduler 500 is associated.

In the example of FIG. 5, the credit comparator 506 is additionally configured to determine whether the scheduler 500 has received a threshold amount of credits in order to operate on the data stored in the input buffer for the selected workload node. For example, the credit comparator 506 compares a field in the buffer credit storage 504 associated with a number of credits received from an external device (e.g., the credit manager 408, the controller 322, etc.) to a field in the buffer credit storage 504 associated with a threshold number of credits for the input buffer to the selected workload node. If the scheduler 500 has not received the threshold amount of credits, the credit comparator 506 repeats the process on another workload node assigned to the CBB with which the scheduler 500 is associated.

In the example illustrated in FIG. 5, if the scheduler 500 has received the threshold amount of credits in order to operate on the data stored in the input buffer, the credit comparator 506 determines whether the scheduler 500 has received a threshold amount of credits in order to write data to the output buffer for the selected workload node. For example, the credit comparator 506 compares a field in the buffer credit storage 504 associated with a number of credits received from an external device (e.g., the credit manager 408, the controller 322, etc.) for the output buffer for the selected workload node to a field in the buffer credit storage 504 associated with a threshold number of credits for the output buffer.

In the example of FIG. 5, if the scheduler 500 has not received the threshold amount of credits, the credit comparator 506 repeats the process on another workload node assigned to the CBB with which the scheduler 500 is associated. If the scheduler 500 has received the threshold amount of credits in order to write data to the output buffer, the credit comparator 506 indicates that the selected workload node is ready to execute. Subsequently, the credit comparator 506 repeats this process for additional workload nodes assigned to the CBB with which the scheduler 500 is associated.

In some examples, the example credit comparator 506 implements example means for comparing. The comparing means is implemented by executable instructions such as that implemented by at least blocks 804, 806, 808, 810, and 812 of FIG. 8. For example, the executable instructions of blocks 804, 806, 808, 810, and 812 of FIG. 8 may be executed on at least one processor such as the example processor 910 and/or the example accelerator 912 shown in the example of FIG. 9. In other examples, the comparing means is implemented by hardware logic, hardware implemented state machines, logic circuitry, and/or any other combination of hardware, software, and/or firmware.

In the example of FIG. 5, the workload node dispatcher 508 is a device that schedules one or more workload nodes assigned to the CBB with which the scheduler 500 is associated to be executed on the CBB with which the scheduler 500 is associated. For example, after the workload nodes assigned to the CBB with which the scheduler 500 is associated have been analyzed, the workload node dispatcher 508 schedules the workload nodes that are ready to execute. For example, the workload node dispatcher 508 schedules the workload nodes that are ready to execute based on a scheduling algorithm such as, a round-robin schedule. The workload node dispatcher 508 subsequently dispatches a workload node according to the schedule. In other examples, the workload node dispatcher 508 can utilize any other suitable arbitration algorithm to schedule the workload nodes that are ready to execute.

In the example illustrated in FIG. 5, as the dispatched workload node is executed by the CBB with which the scheduler 500 is associated, the workload interface 502 sends the credits associated with the input buffer to the external device from which the workload interface 502 received the credits (e.g., the credit manager 408, the controller 322, etc.). The workload node dispatcher 508 additionally determines if there are additional workload nodes in the schedule to be executed. If there are additional workload nodes in the schedule, the workload node dispatcher 508 dispatches the next workload node in the schedule.

In some examples, the example workload node dispatcher 508 implements example means for dispatching. The dispatching means is implemented by executable instructions such as that implemented by at least blocks 814, 816, and 820 of FIG. 8. For example, the executable instructions of blocks 814, 816, and 820 of FIG. 8 may be executed on at least one processor such as the example processor 910 and/or the example accelerator 912 shown in the example of FIG. 9. In other examples, the dispatching means is implemented by hardware logic, hardware implemented state machines, logic circuitry, and/or any other combination of hardware, software, and/or firmware.

In examples disclosed herein, each of the workload interface 502, the buffer credit storage 504, the credit comparator 506, and the workload node dispatcher 508 is in communication with the other elements of the scheduler 500. For example, the workload interface 502, the buffer credit storage 504, the credit comparator 506, and the workload node dispatcher 508 are in communication via an example communication bus 510. In some examples disclosed herein, the workload interface 502, the buffer credit storage 504, the credit comparator 506, and the workload node dispatcher 508 may be in communication via any suitable wired and/or wireless communication system. Additionally, in some examples disclosed herein, each of the workload interface 502, the buffer credit storage 504, the credit comparator 506, and the workload node dispatcher 508 may be in communication with any component exterior to the scheduler 500 via any suitable wired and/or wireless communication system.

Figure 6:
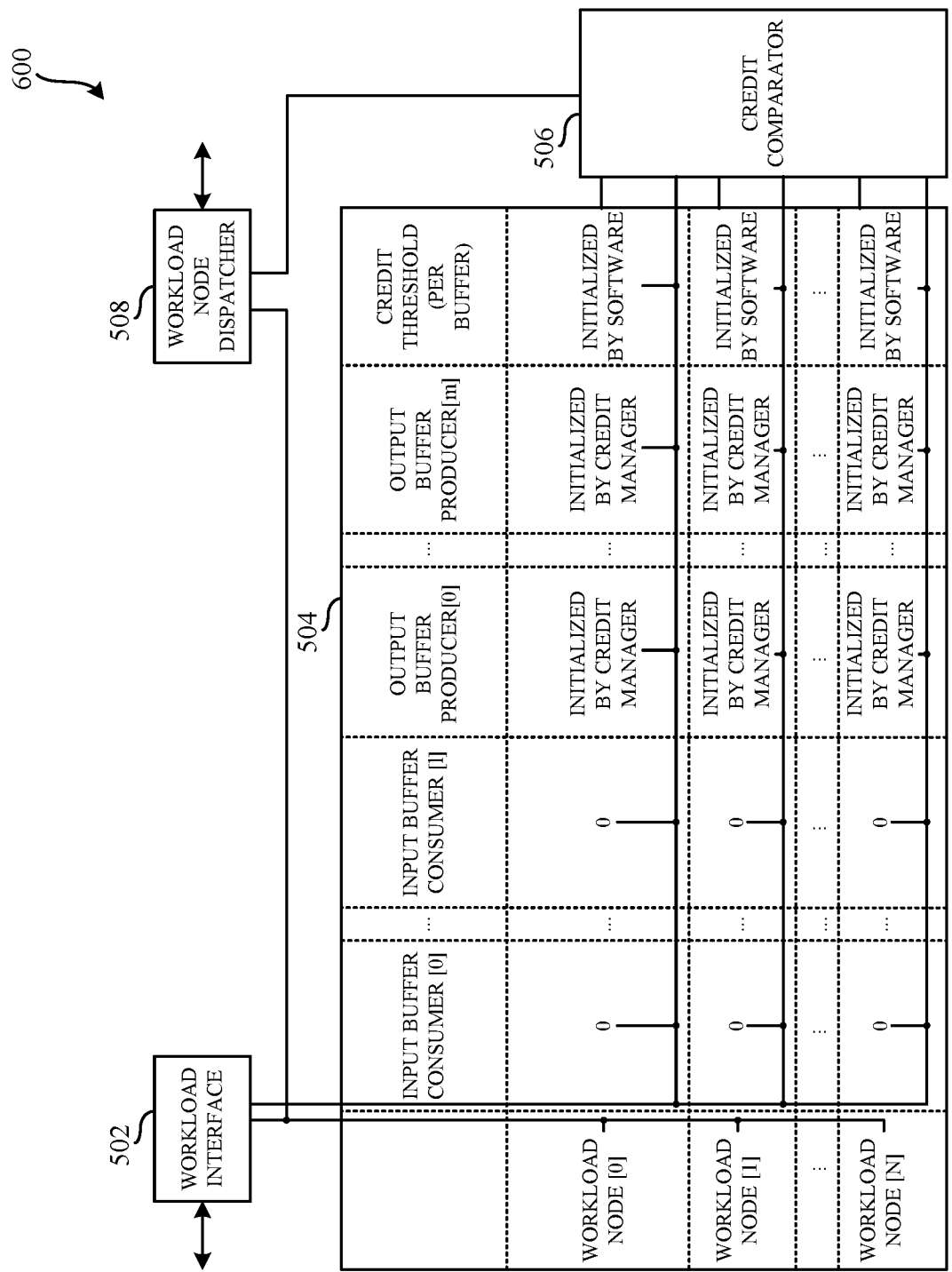
FIG. 6 is a block diagram of an example scheduler showing further detail of the buffer credit storage of FIG. 5.

FIG. 6 is a block diagram of an example scheduler 600 showing further detail of the buffer credit storage 504 of FIG. 5. The scheduler 600 is an example implementation of the first scheduler 326, the second scheduler 328, the third scheduler 330, the fourth scheduler 332, and/or the fifth scheduler 334 of FIG. 3, and/or the first scheduler 424, the second scheduler 426, the third scheduler 428 and/or the fourth scheduler 430 of FIG. 4 and/or the scheduler 500 of FIG. 5, and/or the first scheduler 722, the second scheduler 724, the third scheduler 726, and/or the fourth scheduler 728 of FIG. 7.

In the example of FIG. 6, the scheduler 600 includes the example workload interface 502, the example buffer credit storage 504, the example credit comparator 506, and the example workload node dispatcher 508. The scheduler 600 is a device that determines when a CBB with which the scheduler 600 is associated executes a portion of a workload (e.g., a workload node) that has been assigned to the CBB with which the scheduler 600 is associated.

In the illustrated example of FIG. 6, workload interface 502 is coupled to one or more devices external to the scheduler 600, the buffer credit storage 504 and the workload node dispatcher 508. The workload interface 502 is a device that is configured to communicate with other devices external to the scheduler 600, the buffer credit storage 504, and/or the workload node dispatcher 508. For example, the workload interface 502 can receive and/or otherwise obtain workload nodes to be executed by the CBB with which the scheduler 600 is associated. Additionally or alternatively, the workload interface 502 can transmit to and/or receive credits from one or more devices external to the scheduler 600. Moreover, the workload interface 502 can load credits corresponding to the input buffers to a workload node and/or the output buffers from a workload node into and/or out of the buffer credit storage 504.

In the example illustrated in FIG. 6, the buffer credit storage 504 is a shared storage between at least one of the workload interface 502, the credit comparator 506, and/or the workload node dispatcher 508. The buffer credit storage 504 is a physical storage local to the scheduler 500. However, in other examples, the buffer credit storage 504 may be external to and/or otherwise be remote with respect to the scheduler 500. In further examples, the buffer credit storage 504 may be a virtual storage. In the example of FIG. 5, the buffer credit storage 504 is a persistent storage (e.g., ROM, PROM, EPROM, EEPROM, etc.). In other examples, the buffer credit storage 504 may be a persistent BIOS or a flash storage. In further examples, the buffer credit storage 504 may be a volatile memory.

In the example of FIG. 6, the buffer credit storage 504 is a data structure including rows corresponding to a first workload node WN[0], a second workload node WN[1], and an nth workload node WN[n]. The buffer credit storage 504 additionally includes columns corresponding to an input buffer for a first consumer (e.g., consumer[0]), an input buffer for an lth consumer (e.g., consumer[1]), an output buffer for a first producer (e.g., producer[0]), and an output buffer for an mth producer (e.g., producer[m]). The buffer credit storage 504 further includes a column corresponding to a threshold number of credits for input buffers to each workload node and/or output buffers from each workload node.

In the illustrated example of FIG. 6, each of the first workload node WN[0], the second workload node WN[1], and the nth workload node WN[n] is assigned to the CBB with which the scheduler 600 is associated. In the buffer credit storage 504, the intersection between the rows corresponding to the first workload node WN[0], the second workload node WN[1], and the nth workload node WN[n] and the columns corresponding to the input buffer for the first consumer (e.g., consumer[0]), the input buffer for the lth consumer (e.g., consumer[1]), the output buffer for the first producer (e.g., producer[0]), and the output buffer for the mth producer (e.g., producer[m]) represents fields corresponding to the number of credits received from one or more external devices for that buffer. Moreover, the column corresponding to the threshold number of credits for input buffers to each workload node and/or output buffers from each workload node represents a threshold number of credits that is to be met for a buffer before the CBB with which the scheduler 600 is associated can operate on the respective workload node.

In the example of FIG. 6, the fields in the buffer credit storage 504 at the intersection between the rows corresponding to the first workload node WN[0], the second workload node WN[1], and the nth workload node WN[n] and the columns corresponding to the input buffer for the first consumer (e.g., consumer[0]), the input buffer for the lth consumer (e.g., consumer[1]) are initialized by an external device (e.g., the credit manager 408, the controller 322, etc.) to a value of zero. Additionally, the fields in the buffer credit storage 504 at the intersection between the rows corresponding to the first workload node WN[0], the second workload node WN[1], and the nth workload node WN[n] and the columns corresponding to the output buffer for the first producer (e.g., producer[0]), and the output buffer for the mth producer (e.g., producer[m]) are initialized by external device (e.g., the credit manager 408, the controller 322, etc.) to a value corresponding to an amount of memory partitioned in the associated buffer. Moreover, the column corresponding to the threshold number of credits for input buffers and/or output buffers is initialized by an external device (e.g., the credit manager 408, the controller 322, software executing on the host processor 306, etc.).

In the example illustrated in FIG. 6, the credit comparator 506 is coupled to the buffer credit storage 504 and the workload node dispatcher 508. The credit comparator 506 is a device that is configured to determine whether the threshold number of credits have been received that correspond to input buffers to workload nodes and/or output buffers from workload nodes assigned to the CBB with which the scheduler 600 is associated. In the example of FIG. 6, the workload node dispatcher 508 is coupled to the workload interface 502, the buffer credit storage 504, the credit comparator 506, and one or more devices external to the scheduler 600. The workload node dispatcher 508 is, for example, a device that schedules one or more workload nodes assigned to the CBB with which the scheduler 600 is associated to be executed on the CBB with which the scheduler 600 is associated.

In the example of FIG. 6, in operation, when the workload interface 502 receives and/or otherwise obtains workload nodes from an external device (e.g., the credit manager 408, the controller 322, etc.), the workload interface 502 loads the workload nodes into respective fields in the buffer credit storage 504 corresponding to the workload nodes. Moreover, the credit comparator 506 selects a workload node assigned to the CBB with which the scheduler 600 is associated.

In the illustrated example of FIG. 6, the credit comparator 506 determines whether the scheduler 600 has received a threshold amount of credits in order to operate on the data stored in the input buffer for the selected workload node. For example, the credit comparator 506 compares the field in the buffer credit storage 504 associated with a number of credits received from an external device (e.g., the credit manager 408, the controller 322, etc.) to the field in the buffer credit storage 504 associated with a threshold number of credits for the input buffer to the selected workload node. The threshold number of credits corresponds to a threshold amount of data in an input buffer (e.g., a partitioned space in the memory 420) that is to be met before the CBB with which the scheduler 600 is associated with can execute the consumer workload node. If the scheduler 600 has not received the threshold amount of credits, the credit comparator 506 repeats the process on another workload node assigned to the CBB with which the scheduler 600 is associated.

In the example illustrated in FIG. 6, if the scheduler 600 has received the threshold amount of credits in order to operate on the data stored in the input buffer, the credit comparator 506 determines whether the scheduler 600 has received a threshold amount of credits in order to write data to the output buffer for the selected workload node. For example, the credit comparator 506 compares a field in the buffer credit storage 504 associated with a number of credits received from an external device (e.g., the credit manager 408, the controller 322, etc.) for the output buffer for the selected workload node to a field in the buffer credit storage 504 associated with a threshold number of credits for the output buffer. The threshold number of credits can correspond to a threshold amount of space in an output buffer (e.g., a partitioned space in memory) that is to be met before the CBB with which the scheduler 600 is associated with can execute the producer workload node.

In the example of FIG. 6, if the scheduler 600 has not received the threshold amount of credits, the credit comparator 506 repeats the process on another workload node assigned to the CBB with which the scheduler 600 is associated. If the scheduler 600 has received the threshold amount of credits in order to write data to the output buffer, the credit comparator 506 indicates that the selected workload node is ready to execute. Subsequently, the credit comparator 506 repeats this process for additional workload nodes assigned to the CBB with which the scheduler 600 is associated.

In the example of FIG. 6, the workload node dispatcher 508 is a device that schedules one or more workload nodes assigned to the CBB with which the scheduler 600 is associated to be executed on the CBB with which the scheduler 600 is associated. For example, after the workload nodes assigned to the CBB with which the scheduler 600 is associated have been analyzed, the workload node dispatcher 508 schedules the workload nodes that are ready to execute. For example, the workload node dispatcher 508 schedules the workload nodes that are ready to execute based on a scheduling algorithm such as, a round-robin schedule. The workload node dispatcher 508 subsequently dispatches a workload node according to the schedule. In other examples, the workload node dispatcher 508 can utilize any other suitable arbitration algorithm to schedule the workload nodes that are ready to execute.

In the example illustrated in FIG. 6, as the dispatched workload node is executed by the CBB with which the scheduler 600 is associated, the workload interface 502 sends the credits associated with the input buffer to the external device from which the workload interface 502 received the credits (e.g., the credit manager 408, the controller 322, etc.). The workload node dispatcher 508 additionally determines if there are additional workload nodes in the schedule to be executed. If there are additional workload nodes in the schedule, the workload node dispatcher 508 dispatches the next workload node in the schedule.

Figure 7:
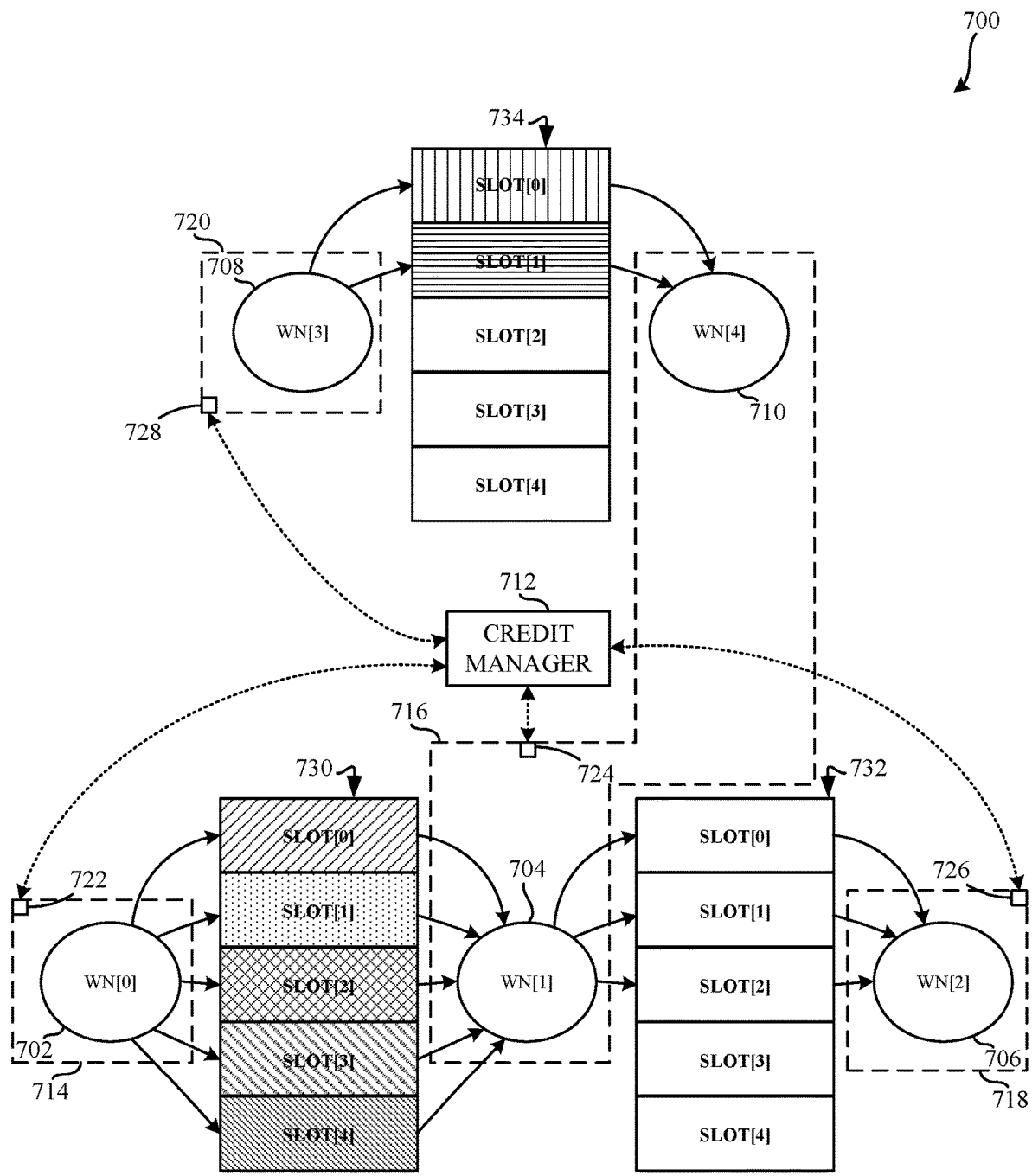
FIG. 7 is a graphical illustration of an example graph representing a workload executing on an accelerator of a heterogenous system implementing pipelining and buffers.

FIG. 7 is a graphical illustration of an example graph 700 representing a workload executing on an accelerator of a heterogenous system implementing pipelining and buffers. For example, the accelerator is the first accelerator 310a and the heterogeneous system is the heterogeneous system 304 of FIG. 3. The example graph 700 includes an example first workload node 702 (WN[0]), an example second workload node 704 (WN[1]), an example third workload node 706 (WN[2]), an example fourth workload node 708 (WN[3]), and an example fifth workload node 710 (WN[4]). In the example of FIG. 7, the accelerator is configured to execute the workload represented by the graph 700 based on a schedule from an example credit manager 712 that assigns workload nodes to various CBBs. For example, the credit manager 712 and/or another controller assigns the first workload node 702 (WN[0]) to an example first CBB 714, the second workload node 704 (WN[1]) to an example second CBB 716, the third workload node 706 (WN[2]) to an example third CBB 718, the fourth workload node 708 (WN[3]) to an example fourth CBB 720, and the fifth workload node 710 (WN[4]) to the example second CBB 716.

In the example of FIG. 7, each of the example first CBB 714, the example second CBB 716, the example third CBB 718, and the example fourth CBB 720 includes an example first scheduler 722, an example second scheduler 724, an example third scheduler 726, and an example fourth scheduler 728. Each of the first scheduler 722, the second scheduler 724, the third scheduler 726, and the fourth scheduler 728 can be implemented by the scheduler 500 of FIG. 5 and/or the scheduler 600 of FIG. 6.

In the illustrated example of FIG. 7, the first workload node 702 (WN[0]) and the second workload node 704 (WN[1]) are associated with an example first buffer 730. The first buffer 730 is an output buffer of the first workload node 702 (WN[0]) and an input buffer to the second workload node 704 (WN[1]). The second workload node 704 (WN[1]) and the third workload node 706 (WN[2]) are associated with an example second buffer 732. The second buffer 732 is output buffer of the second workload node 704 (WN[1]) and an input buffer to the third workload node 706 (WN[2]). The fourth workload node 708 (WN[3]) and the fifth workload node 710 (WN[4]) are associated with an example third buffer 734. The third buffer 734 is an output buffer of the fourth workload node 708 (WN[3]) and an input buffer to the fifth workload node 710 (WN[4]). Each of the first buffer 730, the second buffer 732, and the third buffer 734 can be implemented by a cyclic buffer. In the example of FIG. 7, each of the first buffer 730, the second buffer 732, and third buffer 734 includes five partitions of memory of the accelerator, each of which can store a tile of data.

In the example illustrated in FIG. 7, as the first workload node 702 (WN[0]) is a producer workload node, the credit manager 712 initializes the first scheduler 722 with five credits for the first buffer 730. Similarly, because the second workload node 704 (WN[1]) is a producer workload node, the credit manager 712 initializes the second scheduler 724 with five credits for the second buffer 732. Additionally, as the fourth workload node 708 (WN[3]) is a producer workload node, the credit manager 712 initializes the fourth scheduler 728 with five credits for the third buffer 734.

The five credits provided to each of the first scheduler 722, the second scheduler 724, and the fourth scheduler 728 are representative of the size of the first buffer 730, the second buffer 732, and the third buffer 734. Additionally, as the second workload node 704 (WN[1]) is also a consumer workload node, the credit manager 712 initializes the second scheduler 724 with zero credits for the first buffer 730. Moreover, because the third workload node 706 (WN[2]) is a consumer workload node, the credit manager 712 initializes the third scheduler 726 with zero credits for the second buffer 732. Furthermore, as the fifth workload node 710 (WN[4]) is a consumer workload node, the credit manager 712 initializes the second scheduler 724 with zero credits for the third buffer 734.

In the example of FIG. 7, because the first scheduler 722 has received the threshold number of credits for both the input buffers to and the output buffers from first workload node 702 (WN[0]), the first scheduler 722 dispatches the first workload node 702 (WN[0]) to execute on the first CBB 714. Additionally, because the fourth scheduler 728 has received the threshold number of credits for both the input buffers to and the output buffers from the fourth workload node 708 (WN[3]), the fourth scheduler 728 dispatches the fourth workload node 708 (WN[3]) to execute on the fourth CBB 720. As the first workload node 702 (WN[0]) executes on the first CBB 714, the first CBB 714 transmits data to the first buffer 730. Similarly, as the fourth workload node 708 (WN[3]) executes on the fourth CBB 720, the fourth CBB 720 transmits data to the third buffer 734.

In the example illustrated in FIG. 7, as each of the first CBB 714 and the fourth CBB 720 transmits tiles of data associated with the first workload node 702 (WN[0]) and the fourth workload node 708 (WN[3]), respectively, the first scheduler 722 and the fourth scheduler 728 transmit credits to the credit manager 712 for each tile of data transmitted to the first buffer 730 and the third buffer 734 from the first CBB 714 and the fourth CBB 720, respectively. The credit manager 712 transmits the credits received from the first scheduler 722 to the second scheduler 724 and the credits received from the fourth scheduler 728 to the second scheduler 724. As the fourth CBB 720 executes the fourth workload node 708 (WN[3]), the fourth CBB 720 generates two tiles of data to store in the third buffer 734. Similarly, as the first CBB 714 executes the first workload node 702 (WN[0]), the first CBB 714 generates five tiles of data to store in the first buffer 730.

In the example of FIG. 7, the fourth CBB 720 executes the fourth workload node 708 (WN[3]) more quickly than the first CBB 714 executes the first workload node 702 (WN [0]). Although there is memory available in the second buffer 732, because the data that the fifth workload node 710 (WN[4]) is dependent upon is ready before the data that the second workload node 704 (WN[1]) is dependent upon is ready, the second scheduler 724 selects the fifth workload node 710 (WN[4]) to execute on the second CBB 716 as opposed to the second workload node 704 (WN[1]).

In the illustrated example of FIG. 7, as the fifth workload node 710 (WN[4]) executes on the second CBB 716 and the second CBB 716 consumes tiles of data stored in the third buffer 734, the second scheduler 724 sends the credits associated with the third buffer 734 back to the credit manager 712 for each tile of data that is consumed by the second CBB 716 from the third buffer 734. Subsequently, having met the threshold amount of credits for the first buffer 730 and the second buffer 732, the second scheduler 724 dispatches the second workload node 704 (WN[1]) to execute on the second CBB 716. As the second CBB 716 generates tiles of data associated with the second workload node 704 (WN[1]), and outputs the data to the second buffer 732, the second scheduler 724 sends the credits associated with the second buffer 732 to the credit manager 712 for each tile of data transmitted from the second CBB 716 to the second buffer 732.

In the example of FIG. 7, having received credits associated with the second buffer 732 from the second scheduler 724, the credit manager 712 sends the credits associated with the second buffer 732 to the third scheduler 726. When the third scheduler 726 receives a threshold amount of credits associated with the second buffer 732, the third scheduler 726 dispatches the third workload node 706 (WN[2]) to execute on the third CBB 718. As the third CBB 718 executes the third workload node 706 (WN[2]) and the third CBB 718 consumes tiles of data stored in the second buffer 732, the third scheduler 726 sends credits associated with the second buffer 732 back to the credit manager 712 for each tile of data from the second buffer 732 that is consumed by the third CBB 718.

In additional or alternative examples, the first CBB 714 can correspond to the convolution engine 412 of FIG. 4 and the first scheduler 722 can correspond to the first scheduler 424 of FIG. 4. In some examples, the second CBB 716 can correspond to the RNN engine 416 of FIG. 4 and the second scheduler 724 can correspond to the third scheduler 428 of FIG. 4. In further examples, the third CBB 718 can correspond to the DMA unit 414 of FIG. 4 and the third scheduler 726 can correspond to the second scheduler 426 of FIG. 4. In some examples, the fourth CBB 720 can correspond to the DSP 418 of FIG. 4 and the fourth scheduler 728 can correspond to the fourth scheduler 430 of FIG. 4.

While an example manner of implementing the first scheduler 326, the second scheduler 328, the third scheduler 330, the fourth scheduler 332, and/or the fifth scheduler 334 of FIG. 3 and/or the first scheduler 424, the second scheduler 426, the third scheduler 428, and/or the fourth scheduler 430 of FIG. 4, and/or the first scheduler 722, the second scheduler 724, the third scheduler 726, and/or the fourth scheduler 728 of FIG. 7 is illustrated in FIG. 5 and/or FIG. 6, one or more of the elements, processes and/or devices illustrated in FIG. 5 and/or FIG. 6 may be combined, divided, re-arranged, omitted, eliminated and/or implemented in any other way. Further, the example workload interface 502, the example buffer credit storage 504, the example credit comparator 506, the example workload node dispatcher 508, the example communication bus 510, and/or, more generally, the example scheduler 500 of FIG. 5 and/or the example scheduler 600 of FIG. 6 may be implemented by hardware, software, firmware and/or any combination of hardware, software and/or firmware. Thus, for example, any of the example workload interface 502, the example buffer credit storage 504, the example credit comparator 506, the example workload node dispatcher 508, the example communication bus 510, and/or, more generally, the example scheduler 500 of FIG. 5 and/or the example scheduler 600 of FIG. 6 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload interface 502, the example buffer credit storage 504, the example credit comparator 506, the example work-load node dispatcher 508, the example communication bus 510, and/or, more generally, the example scheduler 500 of FIG. 5 and/or the example scheduler 600 of FIG. 6 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example scheduler 500 of FIG. 5 and/or the example scheduler 600 of FIG. 6 may include one or more elements, processes and/or devices in addition to, or instead of, those illustrated in FIG. 5 and/or FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
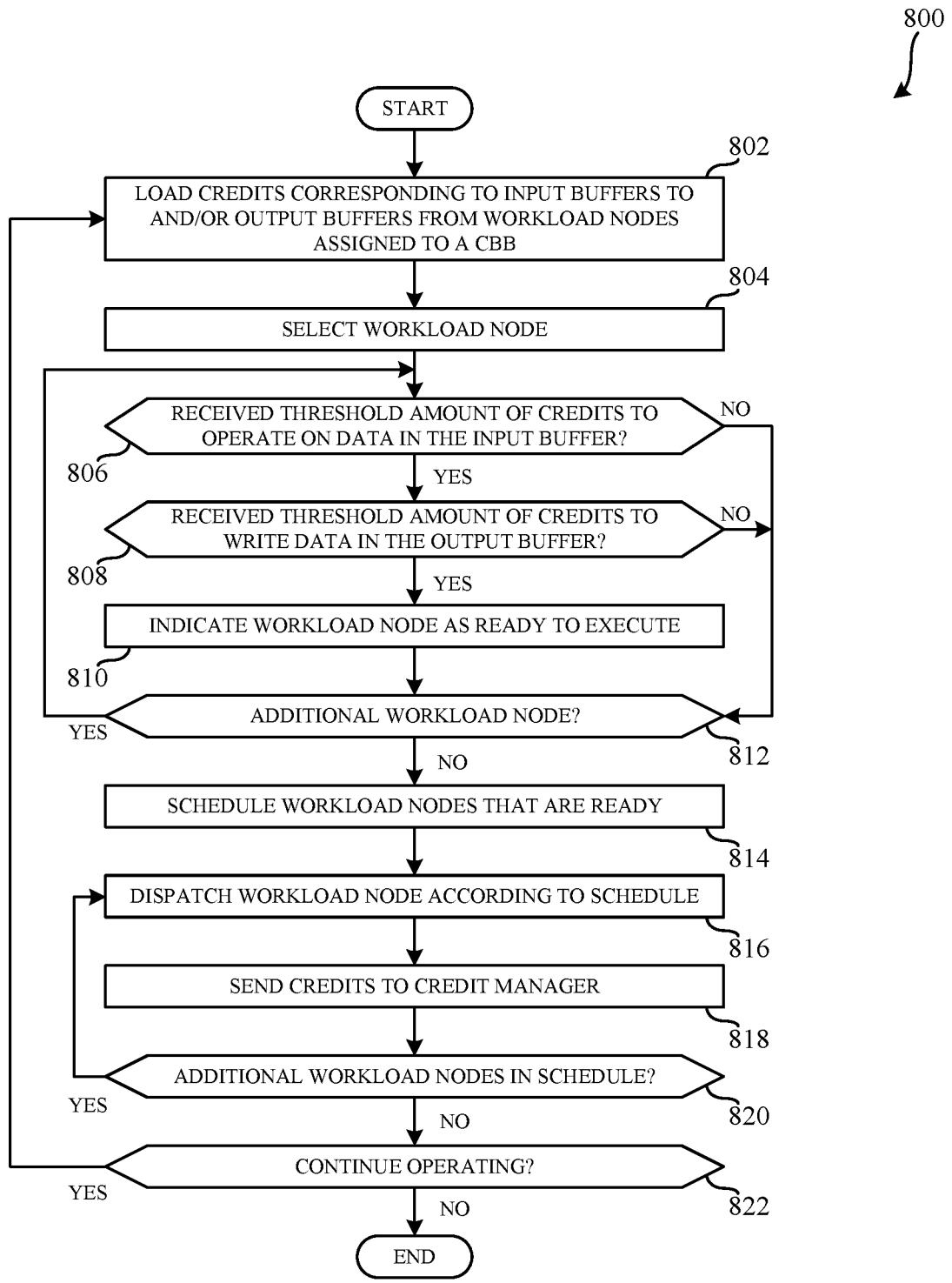
FIG. 8 is a flowchart representative of a process which can be implemented by machine readable instructions which may be executed to implement the scheduler of FIG. 5 and/or the scheduler of FIG. 6.

A flowchart representative of example hardware logic, machine readable instructions, hardware implemented state machines, and/or any combination thereof for implementing the scheduler 500 of FIG. 5 and/or the scheduler 600 of FIG. 6 is shown in FIG. 8. The machine readable instructions may be one or more executable programs or portion(s) of an executable program for execution by a computer processor such as the processor 910 and/or the accelerator 912 shown in the example processor platform 900 discussed below in connection with FIG. 9. The program may be embodied in software stored on a non-transitory computer-readable storage medium such as a CD-ROM, a floppy disk, a hard drive, a DVD, a Blu-ray disk, or a memory associated with the processor 910 and/or the accelerator 912, but the entire program and/or parts thereof could alternatively be executed by a device other than the processor 910 and/or the accelerator 912 and/or embodied in firmware or dedicated hardware. Further, although the example program is described with reference to the flowchart illustrated in FIG. 8, many other methods of implementing the example scheduler 500 of FIG. 5 and/or the scheduler 600 of FIG. 6 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of a process 800 which can be implemented by machine readable instructions which may be executed to implement the scheduler 500 of FIG. 5 and/or the scheduler 600 of FIG. 6. The process 800 begins at block 802 where the workload interface 502 loads into the buffer credit storage 504, credits corresponding to the input buffers to and/or the output buffers from workload nodes assigned to the CBB with which the scheduler 500 and/or the scheduler 600 are associated.

In the example illustrated in FIG. 8, the process 800 continues at block 804 where the credit comparator 506 selects a workload node assigned to the CBB with which the scheduler 500 and/or the scheduler 600 is associated. At block 806, the credit comparator 506 determines whether the scheduler 500 and/or the scheduler 600 has received a threshold amount of credits in order to operate on the data stored in the input buffer for the selected workload node. For example, the credit comparator 506 compares the field in the array or other data structure associated with a number of credits received from an external device (e.g., the credit manager 408, the controller 322, etc.) to the field in the array or other data structure associated with a threshold number of credits for the input buffer to the selected workload node. If the credit comparator 506 determines that the scheduler 500 and/or the scheduler 600 has not received the threshold amount of credits to operate on the data stored in the input buffer for the selected workload node (block 806: NO), the process 800 proceeds to block 812.

In the example of FIG. 8, if the credit comparator 506 determines that the scheduler 500 and/or the scheduler 600 has received the threshold amount of credits in order to operate on the data stored in the input buffer (block 806: YES), the process 800 proceeds to block 808. At block 808, the credit comparator 506 determines whether the scheduler 500 and/or the scheduler 600 has received a threshold amount of credits in order to write data to the output buffer for the selected workload node. For example, the credit comparator 506 compares a field in an array or other data structure associated with a number of credits received from an external device (e.g., the credit manager 408, the controller 322, etc.) for the output buffer for the selected workload node to a field in the array or other data structure associated with a threshold number of credits for the output buffer. If the credit comparator 506 determines that the scheduler 500 and/or the scheduler 600 has not received the threshold amount of credits (block 808: NO), the process 800 proceeds to block 812. If the credit comparator 506 determines that the scheduler 500 and/or the scheduler 600 has received the threshold amount of credits in order to write data to the output buffer (block 808: YES), the credit comparator 506 indicates that the selected workload node is ready to execute at block 810.

In the example of FIG. 8, at block 812, the credit comparator 506 determines whether there is an additional workload node to be processed. If the credit comparator 506 determines that there is an additional workload node to process (block 812: YES), the credit comparator 506 selects an additional workload node and the process 800 proceeds to block 806. If the credit comparator 506 determines that there is not an additional workload node to process (block 812: NO), the process 800 proceeds to block 814.

In the illustrated example of FIG. 8, at block 814, the workload node dispatcher 508 schedules the workload nodes that are ready to execute. At block 816, the workload node dispatcher 508 dispatches a workload node according to the schedule. At block 818, as the dispatched workload node is executed by the CBB with which the scheduler 500 and/or the scheduler 600 is associated, the workload interface 502 sends the credits associated with the input buffer to the external device from which the workload interface 502 received the credits (e.g., the credit manager 408, the controller 322, etc.).

In the example illustrated in FIG. 8, at block 820, the workload node dispatcher 508 determines if there are additional workload nodes in the schedule to be executed. If the workload node dispatcher 508 determines that there are additional workload nodes in the schedule (block 820: YES), the process 800 proceeds to block 816. If the workload node dispatcher 508 determines that there are not additional workload nodes in the schedule (block 820: NO), the process 800 proceeds to block 822.

In the example of FIG. 8, at block 822, the workload interface 502 determines whether to continue operating. For example, a condition that would cause the workload interface 502 to determine to continue operating includes receiving additional workload nodes. If the workload interface 502 determines to continue operating (block 822: YES), the process 800 proceeds to block 802. If the workload interface 502 determines not to continue operating (block 822: NO), the process 800 terminates.

Figure 9:
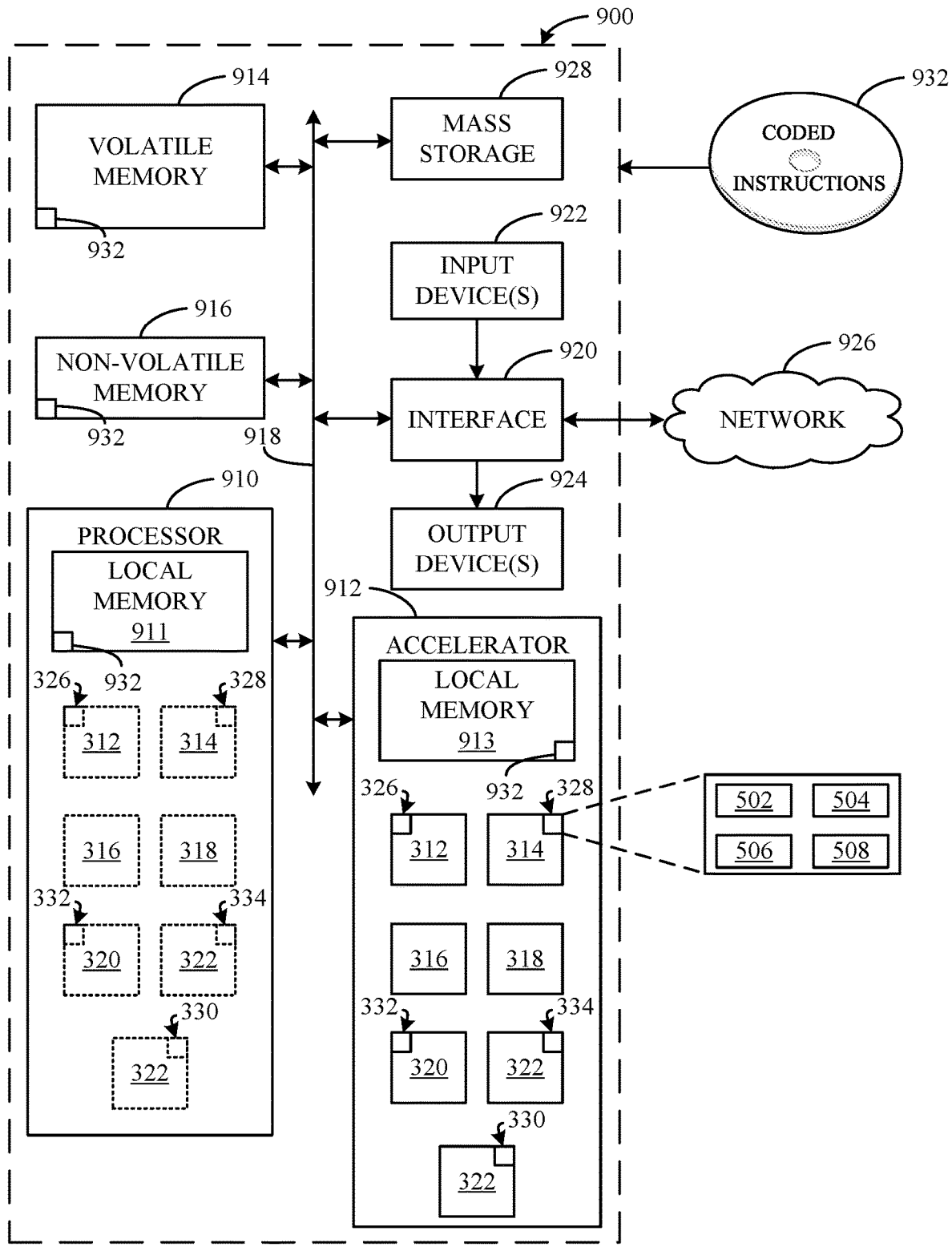
FIG. 9 is a block diagram of an example processor platform structured to execute the instructions of FIG. 8 to implement one or more of the instantiations of the scheduler of FIG. 5 and/or the scheduler of FIG. 6.

FIG. 9 is a block diagram of an example processor platform 900 structured to execute the instructions of FIG. 8 to implement one or more instantiations of the scheduler 500 of FIG. 5 and/or the scheduler 600 of FIG. 6. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 910 and an accelerator 912. The processor 910 of the illustrated example is hardware. For example, the processor 910 can be implemented by one or more integrated circuits, logic circuits, microprocessors, GPUs, DSPs, or controllers from any desired family or manufacturer. The hardware processor may be a semiconductor based (e.g., silicon based) device. Additionally, the accelerator 912 can be implemented by, for example, one or more integrated circuits, logic circuits, microprocessors, GPUs, DSPs, FPGAs, VPUs, controllers, and/or other CBBs from any desired family or manufacturer. The accelerator 912 of the illustrated example is hardware. The hardware accelerator may be a semiconductor based (e.g., silicon based) device. In this example, the accelerator 912 implements the example convolution engine 312, the example RNN engine 314, the example memory 316, the example MMU 318, the example DSP 320, the example controller 322, and the example DMA unit 324. Moreover, each of the example convolution engine 312, the example RNN engine 314, the example DMA unit 324, the example DSP 320, and the example controller 322 includes the example first scheduler 326, the example second scheduler 328, the example third scheduler 330, the example fourth scheduler 332, and the example fifth scheduler 334, respectively. In the example of FIG. 9, each of the example first scheduler 326, the example second scheduler 328, the example third scheduler 330, the example fourth scheduler 332, and the example fifth scheduler 334 includes the example workload interface 502, the example buffer credit storage 504, the example credit comparator 506, the example workload node dispatcher 508, and/or, more generally, the scheduler 500.

In additional or alternative examples, the processor 910 implements the example convolution engine 312, the example RNN engine 314, the example memory 316, the example MMU 318, the example DSP 320, the example controller 322, and the example DMA unit 324. Moreover in such additional or alternative examples, each of the example convolution engine 312, the example RNN engine 314, the example DMA unit 324, the example DSP 320, and the example controller 322 includes the example first scheduler 326, the example second scheduler 328, the example third scheduler 330, the example fourth scheduler 332, and the example fifth scheduler 334, respectively. In such additional or alternative examples, each of the example first scheduler 326, the example second scheduler 328, the example third scheduler 330, the example fourth scheduler 332, and the example fifth scheduler 334 includes the example workload interface 502, the example buffer credit storage 504, the example credit comparator 506, the example workload node dispatcher 508, and/or, more generally, the scheduler 500.

The processor 910 of the illustrated example includes a local memory 911 (e.g., a cache). The processor 910 of the illustrated example is in communication with a main memory including a volatile memory 914 and a non-volatile memory 916 via a bus 918. Moreover, the accelerator 912 of the illustrated example includes a local memory 913 (e.g., a cache). The accelerator 912 of the illustrated example is in communication with a main memory including the volatile memory 914 and the non-volatile memory 916 via the bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 910 and/or the accelerator 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer-readable storage medium such as a CD or DVD.

From the foregoing, it will be appreciated that example methods, apparatus and articles of manufacture have been disclosed that enable out-of-order pipelined execution of static mapping of a workload. Moreover, the example methods, apparatus and articles of manufacture have been disclosed that allow a computational building block to execute workload nodes when the data that a workload node is dependent upon is available and there is sufficient memory available to store the output generated by executing the workload node. Additionally, the examples disclosed herein allow for workload nodes to be executed by the computational building blocks to which the workload nodes are assigned independent of a schedule and/or other ordering. The disclosed methods, apparatus and articles of manufacture improve the efficiency of using a computing device by increasing the utilization of a processing device. Moreover, the example methods, apparatus and articles of manufacture as disclosed herein reduce the number of computational cycles utilized by a processing device in order to process and/or otherwise execute a workload. The disclosed methods, apparatus and articles of manufacture are accordingly directed to one or more improvement(s) in the functioning of a computer.

Example methods, apparatus, systems, and articles of manufacture to enable out-of-order pipelined execution of static mapping of a workload are disclosed herein. Further examples and combinations thereof include the following:

Example 1 includes an apparatus comprising: an interface to load a first number of credits into memory, a comparator to compare the first number of credits to a threshold number of credits associated with memory availability in a buffer, and a dispatcher to, when the first number of credits meets the threshold number of credits, select a workload node of the workload to be executed at a first one of the one or more computational building blocks.

Example 2 includes the apparatus of example 1, wherein the interface is to load the first number of credits into memory when the interface receives the first number of credits from a credit manager, and as one or more tiles of data associated with the workload node are transmitted from the first one of the one or more computational building blocks to the buffer, transmit a credit to the credit manager for each tile transmitted to the buffer.

Example 3 includes the apparatus of example 1, wherein the buffer is an output buffer associated with the workload node, the first number of credits corresponds to the output buffer, and the threshold number of credits corresponds to a threshold amount of memory in the output buffer.

Example 4 includes the apparatus of example 1, wherein the buffer is an input buffer associated with the workload node, the first number of credits corresponds to the input buffer, and the threshold number of credits corresponds to a threshold amount of data in the input buffer.

Example 5 includes the apparatus of example 1, wherein the buffer is a first buffer, the threshold number of credits is a first threshold number of credits, the comparator is to compare a second number of credits to a second threshold number of credits associated with memory availability in a second buffer, and the dispatcher is to, when (1) the first number of credits meets the first threshold number of credits and (2) the second number of credits meets the second threshold number of credits, select the workload node to be executed at the first one of the one or more computational building blocks.

Example 6 includes the apparatus of example 5, wherein the second buffer is an input buffer associated with the workload node, the second number of credits corresponds to the input buffer, and the second threshold number of credits corresponds to a threshold amount of data in the input buffer.

Example 7 includes the apparatus of example 1, wherein the threshold number of credits is a first threshold number of credits, the workload node is a first workload node, and when (1) the first number of credits meets the first threshold number of credits and (2) a second number of credits meets a second threshold number of credits, the dispatcher is to schedule the first workload node and a second workload node to be executed at the first one of the one or more computational building blocks.

Example 8 includes a non-transitory computer-readable storage medium comprising instructions which, when executed, cause at least one processor to at least load a first number of credits into memory, compare the first number of credits to a threshold number of credits associated with memory availability in a buffer, and when the first number of credits meets the threshold number of credits, select a workload node of the workload to be executed at a computational building block.

Example 9 includes the non-transitory computer-readable storage medium of example 8, wherein the instructions, when executed, cause the at least one processor to load the first number of credits into memory when the first number of credits are received from a credit manager, and as one or more tiles of data associated with the workload node are transmitted from the computational building block to the buffer, transmit a credit to the credit manager for each tile transmitted to the buffer.

Example 10 includes the non-transitory computer-readable storage medium of example 8, wherein the buffer is an output buffer associated with the workload node, the first number of credits corresponds to the output buffer, and the threshold number of credits corresponds to a threshold amount of memory in the output buffer.

Example 11 includes the non-transitory computer-readable storage medium of example 8, wherein the buffer is an input buffer associated with the workload node, the first number of credits corresponds to the input buffer, and the threshold number of credits corresponds to a threshold amount of data in the input buffer.

Example 12 includes the non-transitory computer-readable storage medium of example 8, wherein the buffer is a first buffer, the threshold number of credits is a first threshold number of credits, and wherein the instructions, when executed, cause the at least one processor to compare a second number of credits to a second threshold number of credits associated with memory availability in a second buffer, and when (1) the first number of credits meets the first threshold number of credits and (2) the second number of credits meets the second threshold number of credits, select the workload node to be executed at the computational building block.

Example 13 includes the non-transitory computer-readable storage medium of example 12, wherein the second buffer is an input buffer associated with the workload node, the second number of credits corresponds to the second buffer, and the second threshold number of credits corresponds to a threshold amount of data in the input buffer.

Example 14 includes the non-transitory computer-readable storage medium of example 8, wherein the threshold number of credits is a first threshold number of credits, the workload node is a first workload node, and wherein the instructions, when executed, cause the at least one processor to, when (1) the first number of credits meets the first threshold number of credits and (2) a second number of credits meets a second threshold number of credits, schedule the first workload node and a second workload node to be executed at the computational building block.

Example 15 includes an apparatus comprising: means for interfacing, the means for interfacing to load a first number of credits into memory, means for comparing, the means for comparing to compare the first number of credits to a threshold number of credits associated with memory availability in a buffer, and means for dispatching, the means for dispatching to, when the first number of credits meets the threshold number of credits, select a workload node of the workload to be executed at a first one of the one or more computational building blocks.

Example 16 includes the apparatus of example 15, wherein the means for interfacing is to load the first number of credits into memory when the means for interfacing receives the first number of credits from a credit manager, and as one or more tiles of data associated with the workload node are transmitted from the first one of the one or more computational building blocks to the buffer, transmit a credit to the credit manager for each tile transmitted to the buffer.

Example 17 includes the apparatus of example 15, wherein the buffer is an output buffer associated with the workload node, the first number of credits corresponds to the output buffer, and the threshold number of credits corresponds to a threshold amount of memory in the output buffer.

Example 18 includes the apparatus of example 15, wherein the buffer is an input buffer associated with the workload node, the first number of credits corresponds to the input buffer, and the threshold number of credits corresponds to a threshold amount of data in the input buffer.

Example 19 includes the apparatus of example 15, wherein the buffer is a first buffer, the threshold number of credits is a first threshold number of credits, the means for comparing is to compare a second number of credits to a second threshold number of credits associated with memory availability in a second buffer, and the means for dispatching is to, when (1) the first number of credits meets the first threshold number of credits and (2) the second number of credits meets the second threshold number of credits, select the workload node to be executed at the first one of the one or more computational building blocks.

Example 20 includes the apparatus of example 19, wherein the second buffer is an input buffer associated with the workload node, the second number of credits corresponds to the input buffer, and the second threshold number of credits corresponds to a threshold amount of data in the input buffer.

Example 21 includes the apparatus of example 15, wherein the threshold number of credits is a first threshold number of credits, the workload node is a first workload node, and when (1) the first number of credits meets the first threshold number of credits and (2) a second number of credits meets a second threshold number of credits, the means for dispatching is to schedule the first workload node and a second workload node to be executed at the first one of the one or more computational building blocks.

Example 22 includes a method comprising: loading a first number of credits into memory, comparing the first number of credits to a threshold number of credits associated with memory availability in a buffer, and when the first number of credits meets the threshold number of credits, selecting a workload node of the workload to be executed at a first one of the one or more computational building blocks.

Example 23 includes the method of example 22, further including loading the first number of credits into memory when the first number of credits are received from a credit manager, and as one or more tiles of data associated with the workload node are transmitted from the first one of the one or more computational building blocks to the buffer, transmitting a credit to the credit manager for each tile transmitted to the buffer.

Example 24 includes the method of example 22, wherein the buffer is an output buffer associated with the workload node, the first number of credits corresponds to the output buffer, and the threshold number of credits corresponds to a threshold amount of memory in the output buffer.

Example 25 includes the method of example 22, wherein the buffer is an input buffer associated with the workload node, the first number of credits corresponds to the input buffer, and the threshold number of credits corresponds to a threshold amount of data in the input buffer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first compute unit including a first local credit manager, the first compute unit associated with a first buffer to which the first compute unit is to write data;
a second compute unit including a second local credit manager, the second compute unit associated with a second buffer from which the second compute unit is to read data;
at least one fabric coupled to the first compute unit and the second compute unit; and
a central credit manager coupled to the at least one fabric, the central credit manager to:
cause transmission of a first credit to the first local credit manager, the first credit corresponding to first data to be processed by the first compute unit to generate second data to be stored in the first buffer;
access the first credit from the first local credit manager of the first compute unit; and
decrease a count of credits for the second compute unit, at least one of the first compute unit, the second compute unit, the at least one fabric, or the central credit manager implemented by hardware.

2. The apparatus of claim 1, wherein the central credit manager is to access the first credit from the first local credit manager of the first compute unit in response to the first compute unit processing the first data.

3. The apparatus of claim 1, wherein the central credit manager is to decrease the count of credits for the second compute unit in response to availability of the second data at the second buffer.

4. The apparatus of claim 1, wherein the count of credits for the second compute unit is a first count of credits, and the central credit manager is to:
initialize a second count of credits for the first compute unit; and
initialize the first count of credits for the second compute unit.

5. The apparatus of claim 1, wherein the central credit manager is to cause transmission of the first credit to the first local credit manager based on the first data being associated with a task assigned to the first compute unit.

6. An apparatus comprising:
memory;
instructions; and
processor circuitry to execute the instructions to:
cause transmission of a first credit to a first local credit manager of a first compute unit, the first credit corresponding to first data to be processed by the first compute unit to generate second data to be stored in a first buffer associated with the first compute unit, the first compute unit to write data to the first buffer;
access the first credit from the first local credit manager of the first compute unit; and
decrease a count of credits for a second compute unit including a second local credit manager, the second compute unit associated with a second buffer from which the second compute unit is to read data.

7. The apparatus of claim 6, wherein the processor circuitry is to access the first credit from the first local credit manager of the first compute unit in response to the first compute unit processing the first data.

8. The apparatus of claim 6, wherein the processor circuitry is to decrease the count of credits for the second compute unit in response to availability of the second data at the second buffer.

9. The apparatus of claim 6, wherein the count of credits for the second compute unit is a first count of credits, and the processor circuitry is to initialize a second count of credits for the first compute unit and the first count of credits for the second compute unit.

10. The apparatus of claim 6, wherein the processor circuitry is to cause transmission of the first credit to the first local credit manager based on the first data being associated with a task assigned to the first compute unit.

11. A non-transitory computer-readable medium comprising instruction which, when executed, cause processor circuitry to:
cause transmission of a first credit to a first local credit manager of a first compute unit, the first credit corresponding to first data to be processed by the first compute unit to generate second data to be stored in a first buffer associated with the first compute unit, the first compute unit to write data to the first buffer;
access the first credit from the first local credit manager of the first compute unit; and
decrease a count of credits for a second compute unit including a second local credit manager, the second compute unit associated with a second buffer from which the second compute unit is to read data.

12. The non-transitory computer-readable medium of claim 11, wherein the instructions, when executed, cause the processor circuitry to access the first credit from the first local credit manager of the first compute unit in response to the first compute unit processing the first data.

13. The non-transitory computer-readable medium of claim 11, wherein the instructions, when executed, cause the processor circuitry to decrease the count of credits for the second compute unit in response to availability of the second data at the second buffer.

14. The non-transitory computer-readable medium of claim 11, wherein the count of credits for the second compute unit is a first count of credits, and the instructions, when executed, cause the processor circuitry to initialize a second count of credits for the first compute unit and the first count of credits for the second compute unit.

15. The non-transitory computer-readable medium of claim 11, wherein the instructions, when executed, cause the processor circuitry to cause transmission of the first credit to the first local credit manager based on the first data being associated with a task assigned to the first compute unit.

16. A method comprising:
transmitting, by executing an instruction with processor circuitry, a first credit to a first local credit manager of a first compute unit, the first credit corresponding to first data to be processed by the first compute unit to generate second data to be stored in a first buffer associated with the first compute unit, the first compute unit to write data to the first buffer;
accessing, by executing an instruction with the processor circuitry, the first credit from the first local credit manager of the first compute unit; and
decreasing, by executing an instruction with the processor circuitry, a count of credits for a second compute unit including a second local credit manager, the second compute unit associated with a second buffer from which the second compute unit is to read data.

17. The method of claim 16, further including accessing the first credit from the first local credit manager of the first compute unit in response to the first compute unit processing the first data.

18. The method of claim 16, further including decreasing the count of credits for the second compute unit in response to availability of the second data at the second buffer.

19. The method of claim 16, wherein the count of credits for the second compute unit is a first count of credits, and the method further includes initializing a second count of credits for the first compute unit and the first count of credits for the second compute unit.

20. The method of claim 16, further including transmitting the first credit to the first local credit manager based on the first data being associated with a task assigned to the first compute unit.

* * * * *